United States Patent
Lee et al.

(10) Patent No.: US 12,002,628 B2
(45) Date of Patent: *Jun. 4, 2024

(54) MULTILAYERED ELECTRONIC COMPONENT AND METHOD OF MANUFACTURING THE SAME

(71) Applicant: SAMSUNG ELECTRO-MECHANICS CO., LTD., Suwon-si (KR)

(72) Inventors: Tae Gyeom Lee, Suwon-si (KR); Gi Long Kim, Suwon-si (KR); Seon Jae Mun, Suwon-si (KR); Byung Rok Ahn, Suwon-si (KR); Kyoung Jin Cha, Suwon-si (KR)

(73) Assignee: SAMSUNG ELECTRO-MECHANICS CO., LTD., Suwon-si (KR)

( * ) Notice: Subject to any disclaimer, the term of this patent is extended or adjusted under 35 U.S.C. 154(b) by 37 days.

This patent is subject to a terminal disclaimer.

(21) Appl. No.: 17/824,139

(22) Filed: May 25, 2022

(65) Prior Publication Data

US 2023/0207210 A1    Jun. 29, 2023

(30) Foreign Application Priority Data

Dec. 29, 2021   (KR) .......................... 10-2021-0190626

(51) Int. Cl.
*H01G 4/30* (2006.01)
*H01G 4/012* (2006.01)
(Continued)

(52) U.S. Cl.
CPC ............... *H01G 4/30* (2013.01); *H01G 4/012* (2013.01); *H01G 4/12* (2013.01); *H01G 4/224* (2013.01)

(58) Field of Classification Search
None
See application file for complete search history.

(56) References Cited

U.S. PATENT DOCUMENTS

| 2011/0141652 A1* | 6/2011 | Chang | H01G 4/12 361/272 |
| 2011/0141656 A1* | 6/2011 | Yun | H01G 4/005 29/25.42 |

(Continued)

FOREIGN PATENT DOCUMENTS

| JP | 05304042 A | * 11/1993 |
| JP | 2002329638 A | * 11/2002 |

(Continued)

*Primary Examiner* — Eric W Thomas
(74) *Attorney, Agent, or Firm* — Morgan, Lewis & Bockius LLP

(57) ABSTRACT

Controlling an area fraction of a region of a capacitance formation portion of a multilayer electronic component may suppress occurrence of a short circuit between internal electrodes disposed inside a body of the multilayer electronic component, lower capacitance or reduced breakdown voltage. A range of brightness intensity of the region of the capacitance formation portion of the multilayer electronic component is 110% or more and 126% or less compared to an average value of brightness intensity of a cover portion disposed on the capacitance formation portion.

27 Claims, 16 Drawing Sheets
(4 of 16 Drawing Sheet(s) Filed in Color)

(51) Int. Cl.
 *H01G 4/12* (2006.01)
 *H01G 4/224* (2006.01)

(56) References Cited

U.S. PATENT DOCUMENTS

2012/0099241 A1* 4/2012 Chang .................... H01G 4/012
 361/301.4
2013/0049532 A1 2/2013 Kim et al.

FOREIGN PATENT DOCUMENTS

| JP | 2018-103509 A | 7/2018 |
| KR | 10-2010-0048680 A | 5/2010 |
| KR | 10-2013-0024530 A | 3/2013 |

* cited by examiner

MULTILAYERED ELECTRONIC COMPONENT AND METHOD OF MANUFACTURING THE SAME

CROSS-REFERENCE TO RELATED APPLICATION(S)

This application claims benefit of priority to Korean Patent Application No. 10-2021-0190626 filed on Dec. 29, 2021 in the Korean Intellectual Property Office, the disclosure of which is incorporated herein by reference in its entirety.

TECHNICAL FIELD

The present disclosure relates to a multilayer electronic component and a method of manufacturing the same.

BACKGROUND

A multilayer ceramic capacitor (MLCC), one of multilayer electronic components, may be a chip-type condenser which is mounted on a printed circuit board of any of various electronic products, such as an imaging device such as a liquid crystal display (LCD) or a plasma display panel (PDP), a computer, a smartphone or a mobile phone, to serve to charge or discharge electricity therein or therefrom.

The multilayer ceramic capacitor has a small size, implements high capacitance, may be easily mounted on a circuit board, and may thus be used as a component of various electronic devices. There has been increasing demand for the multilayer ceramic capacitor to have a smaller size and higher capacitance as each of various electronic devices such as a computer and a mobile device has a smaller size and higher output.

In order for the multilayer ceramic capacitor to have the smaller size and the higher capacitance, required is technology in which each of an internal electrode and a dielectric layer has a smaller thickness.

However, as the internal electrode has the smaller thickness, a problem may occur such as a short circuit between the internal electrodes, reduced capacitance, lower breakdown voltage or the like.

SUMMARY

An aspect of the present disclosure may provide a multilayer electronic component having higher reliability.

Another aspect of the present disclosure may provide a multilayer electronic component including an internal electrode having uniform connectivity.

Another aspect of the present disclosure may provide a multilayer electronic component including an internal electrode having excellent smoothness.

Another aspect of the present disclosure may provide a reliable multilayer electronic component having a smaller size and higher capacitance.

Another aspect of the present disclosure may provide a method of manufacturing a multilayer electronic component having excellent productivity and high reliability.

However, the present disclosure is not limited to the description above, and may be more readily understood in the description of exemplary embodiments of the present disclosure.

According to an exemplary embodiment of the present disclosure, a multilayer electronic component may include: a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of internal electrodes alternately disposed in the first direction, while having a respective one of the plurality of dielectric layers interposed therebetween, and cover portions disposed on both end surfaces of the capacitance formation portion in the first direction; and external electrodes disposed on the body. SL may be 5.5 area % or less in which SL indicates a ratio of an area of NL to an area of ML, ML indicates a region excluding 35 μm at both ends of the capacitance formation portion in the second direction, and positioned in a center of a region in which a first cross-section of the body in a first-second direction is divided into thirds in the first direction, and NL indicates a region of ML in which a range of brightness intensity is 110% or more and 126% or less compared to an average value of brightness intensity of one of the cover portions in the first cross-section.

According to another exemplary embodiment of the present disclosure, a multilayer electronic component may include: a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of electrodes alternately disposed in the first direction, while having a respective one of the plurality of dielectric layers interposed therebetween, and cover portions disposed on both end surfaces of the capacitance formation portion in the first direction; and external electrodes disposed on the body. A range of a standard deviation of connectivity of an internal electrode measured in ML is 1.3% or less, in which ML indicates a region excluding 35 μm at both ends of the capacitance formation portion in the second direction, and positioned in a center of a region in which a first cross-section of the body in a first-second direction is divided into thirds in the first direction, and the connectivity of the internal electrode in ML indicates a ratio of a length of a portion in which the internal electrode in ML is actually formed to a length of the internal electrode in ML.

According to another exemplary embodiment of the present disclosure, a method of manufacturing a multilayer electronic component may include: coating a silicone pattern on a continuously supplied polymer sheet; applying a paste for an internal electrode to the polymer sheet on which the silicone pattern is coated; transferring the paste for an internal electrode, disposed on the silicone pattern to a continuously supplied ceramic green sheet, to form an internal electrode pattern on the ceramic green sheet; forming a stack body by stacking the ceramic green sheets on each of which the internal electrode pattern is printed on each other; cutting the stack body to form a unit stack body; sintering the unit stack body to form a body; and forming an external electrode on the body to form the multilayer electronic component.

According to another exemplary embodiment of the present disclosure, a multilayer electronic component may include: a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of internal electrodes alternately disposed in the first direction, while having a respective one of the plurality of dielectric layers interposed therebetween, and cover portions disposed on both end surfaces of the capacitance formation portion in the first direction; and external electrodes disposed on the body. A range of a value of a coefficient of variation (CV) of connectivity of an internal electrode in ML may be 1.8% or less, the connectivity of the internal electrode in ML may indicate a ratio of a length of a portion in which the internal electrode in ML is actually formed to a length of the internal electrode in ML, and ML may indicate a region excluding 35 μm at both ends of the capacitance formation portion in the second direction, and positioned in a center of a region in which a first cross-section of the body in a first-second direction is divided into thirds in the first direction.

BRIEF DESCRIPTION OF DRAWINGS

The patent or application file contains as least one drawing executed in color. Copies of this patent or patent application publication with color drawing(s) will be provided by the Office upon request and payment of the necessary fee.

The above and other aspects, features and advantages of the present disclosure will be more clearly understood from the following detailed description taken in conjunction with the accompanying drawings, in which.

DETAILED DESCRIPTION

Figure 1:
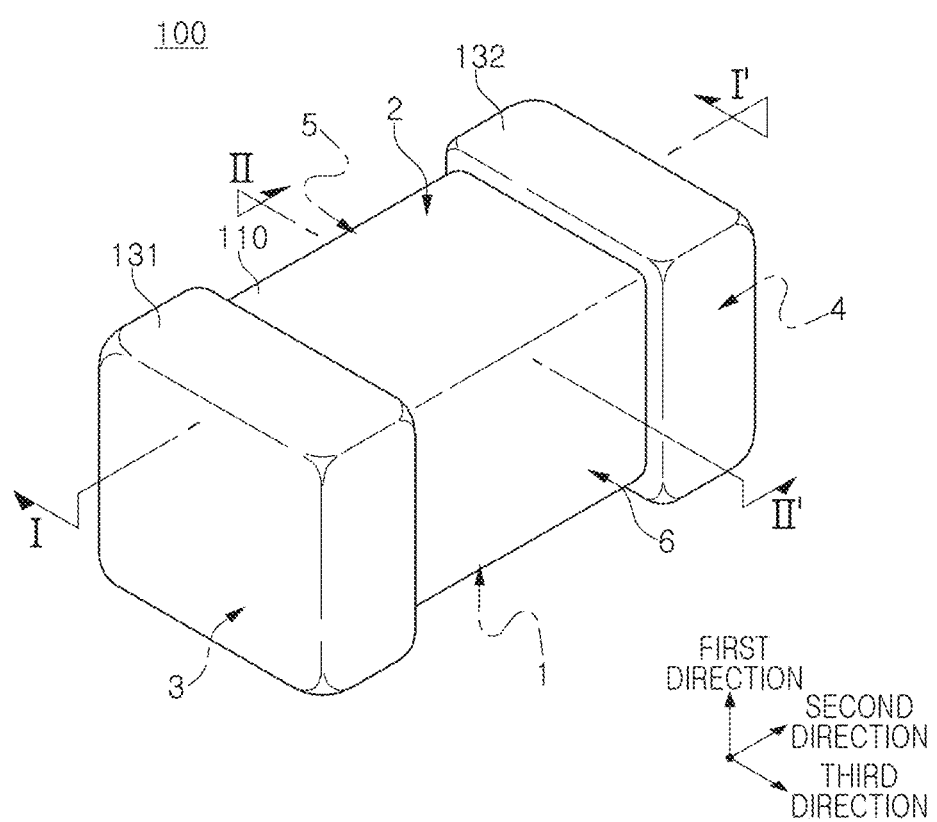
FIG. 1 is a perspective view schematically showing a multilayer electronic component according to an exemplary embodiment of the present disclosure.

Hereinafter, exemplary embodiments of the present disclosure will now be described in detail with reference to the accompanying drawings.

In the drawings, a first direction may indicate a thickness (T) direction, a second direction may indicate a length (L) direction, and a third direction may indicate a width (W) direction.

Multilayer Electronic Component

Figure 2:
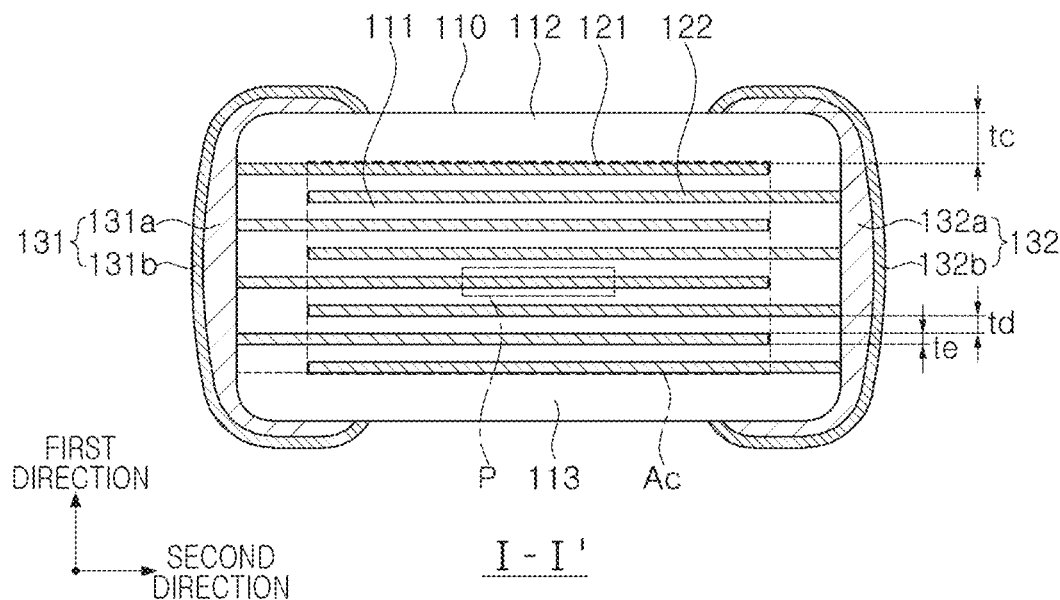
FIG. 2 is a cross-sectional view taken along line I-I' of FIG. 1.
Figure 3:
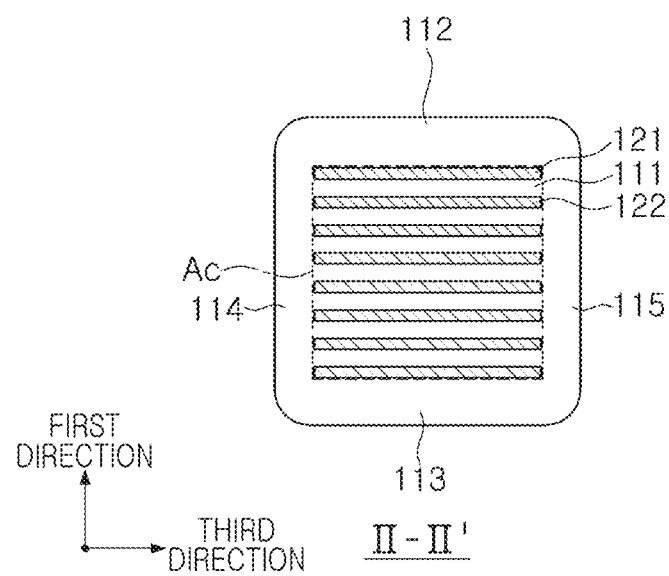
FIG. 3 is a cross-sectional view taken along line II-II' of FIG. 1.
Figure 4:
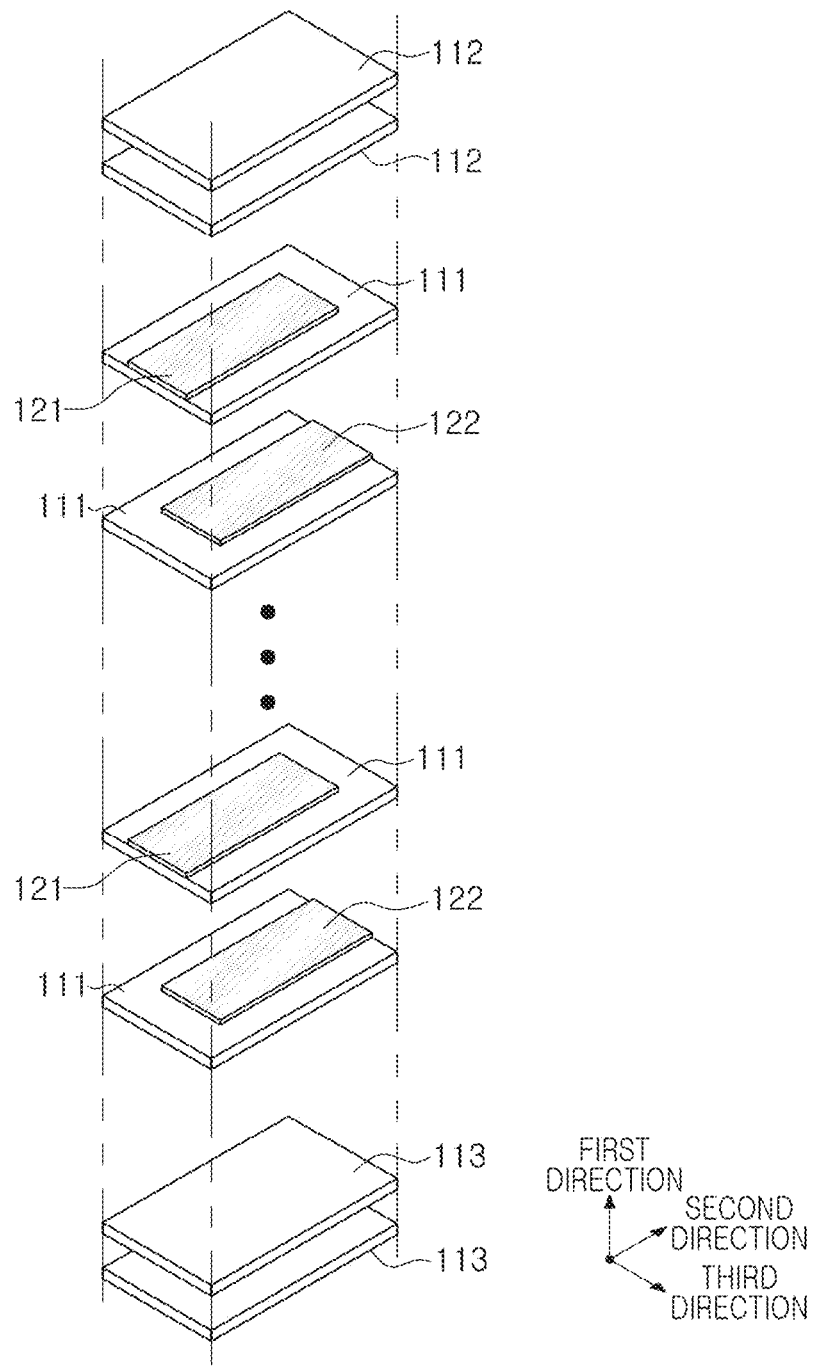
FIG. 4 is an exploded perspective view schematically showing an exploded capacitor body in which a dielectric layer and an internal electrode of FIG. 1 are stacked on each other.
Figure 5:
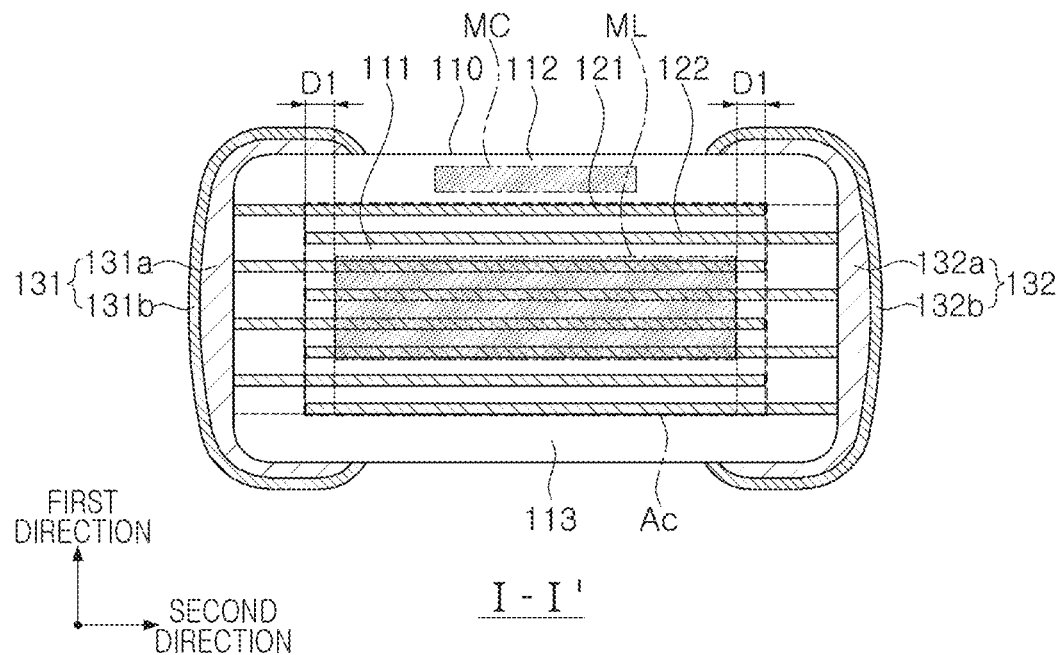
FIG. 5 is a cross-sectional view taken along line I-I' of FIG. 1 for explaining a measurement region.
Figure 6:
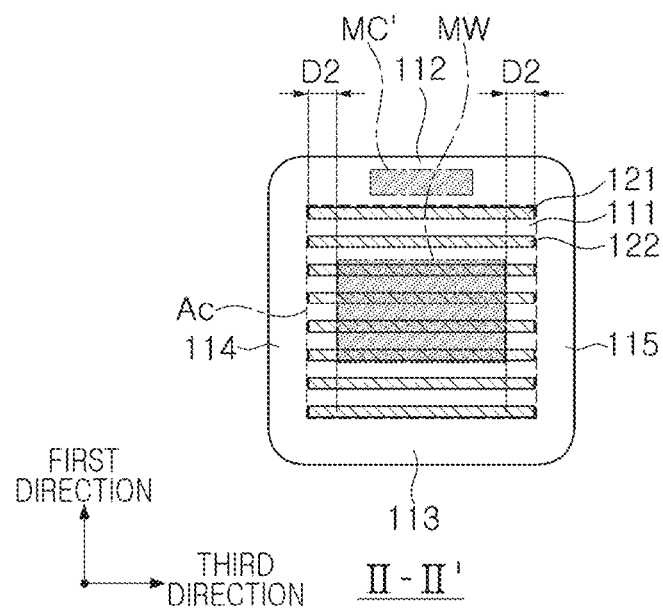
FIG. 6 is a cross-sectional view taken along II-II' of FIG. 1 for explaining the measurement region.

FIG. 1 is a perspective view schematically showing a multilayer electronic component according to an exemplary embodiment of the present disclosure, FIG. 2 is a cross-sectional view taken along line I-I' of FIG. 1, FIG. 3 is a cross-sectional view taken along line II-II' of FIG. 1, FIG. 4 is an exploded perspective view schematically showing an exploded capacitor body in which a dielectric layer and an internal electrode of FIG. 1 are stacked on each other, FIG. 5 is a cross-sectional view taken along line I-I' of FIG. 1 for explaining a measurement region, and FIG. 6 is a cross-sectional view taken along II-II' of FIG. 1 for explaining the measurement region.

Hereinafter, a multilayer electronic component 100 according to an exemplary embodiment of the present disclosure is described with reference to FIGS. 1 through 6.

The multilayer electronic component 100 according to an exemplary embodiment of the present disclosure may include: a body 100 including first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, and including a capacitance formation portion Ac including a plurality of dielectric layers 111 and a plurality of internal electrodes 121 and 122 alternately disposed in the first direction, while having the dielectric layer interposed therebetween, and cover portions 112 and 113 disposed on both end surfaces of the capacitance formation portion Ac in the first direction; and external electrodes 131 and 132 disposed on the body. SL may be 5.5 area % or less in which SL indicates a ratio of an area of NL to an area of ML, ML indicates a region excluding 35 μm (D1) at both ends of the capacitance formation portion Ac in the second direction, and positioned in a center of a region in which a cross-section of the body in a first-second direction is divided into thirds in the first direction, and NL indicates a region of ML in which 110% or more and 126% or less is a range of brightness intensity compared to an average value of brightness intensity of the cover portion.

In order for a multilayer ceramic capacitor, one of the multilayer electronic components to have a smaller size and higher capacitance, required is technology in which each of the internal electrode and the dielectric layer has a smaller thickness. However, as the internal electrode has the smaller thickness, a problem may occur such as a short circuit between the internal electrodes, reduced capacitance, lower breakdown voltage (BDV) or the like.

As a result of a review, the present inventors find that a problem such as a short circuit between the internal electrodes, lower capacitance, reduced breakdown voltage or the like may occur as the internal electrode has the smaller thickness, because the internal electrode has lower smoothness and non-uniform connectivity. However, the stack number of internal electrodes and dielectric layers may be gradually increased as the multilayer electronic component has the smaller size and the higher capacitance. Therefore, required is a lot of effort and time to quantitatively analyze the connectivity and smoothness of the internal electrode included in the multilayer electronic component. In this regard, the present inventors find that the uniform connectivity and smoothness of the internal electrode are correlated with an area fraction SL of the region of ML of the capacitance formation portion Ac, in which 110% or more and 126% or less is the range of the brightness intensity compared to the average value of the brightness intensity of the cover portion, and it is possible to solve the problem such as the short circuit between the internal electrodes, the lower capacitance, the reduced breakdown voltage or the like by controlling SL, and thus complete the present disclosure.

According to an exemplary embodiment of the present disclosure, it is possible to secure the uniform connectivity of the internal electrode by controlling the area fraction SL of the region of ML of the capacitance formation portion Ac, in which 110% or more and 126% or less is the range of the brightness intensity compared to the average value of the brightness intensity of the cover portion, and it is possible to solve the problem such as the short circuit between the internal electrodes, the lower capacitance, the reduced breakdown voltage or the like by improving the smoothness of the internal electrode.

Hereinafter, the description specifically describes each component of the multilayer electronic component 100.

The body 110 may include the dielectric layer 111 and the internal electrode 121 or 122, which are alternately stacked on each other.

The body 110 is not limited to a particular shape, and may have a hexahedral shape or a shape similar to the hexahedral shape, as shown in the drawings. The body 110 may not have the shape of a hexahedron having perfectly straight lines because a ceramic powder included in the body 110 is contracted in a process in which the body is sintered. However, the body 110 may have a substantially hexahedral shape.

The body 110 may include the first and second surfaces 1 and 2 opposing each other in the first direction, the third and fourth surfaces 3 and 4 connected to the first and second surfaces 1 and 2 and opposing each other in the second direction, and fifth and sixth surfaces 5 and 6 connected to the first and second surfaces 1 and 2, connected to the third and fourth surfaces 3 and 4, and opposing each other in the third direction.

The plurality of dielectric layers 111 included in the body 110 may already be sintered, and adjacent dielectric layers 111 may thus be integrated with each other, thus making it difficult to confirm a boundary therebetween without using a scanning electron microscope (SEM).

According to an exemplary embodiment of the present disclosure, a raw material used for forming the dielectric layer 111 is not particularly limited as long as the capacitor obtains sufficient capacitance from the raw material. For example, the dielectric layer may use a material such as a barium titanate-based material, a lead composite perovskite-based material or a strontium titanate-based material. The barium titanate-based material may include the barium titanate ($BaTiO_3$)-based ceramic powder, and this ceramic powder may be, for example, $BaTiO_3$ or $(Ba_{1-x}Ca_x)TiO_3$ (0<x<1), $Ba(Ti_{1-y}Ca_y)O_3$ (0<y<1), $(Ba_{1-x}Ca_x)(Ti_{1-y}Zr_y)O_3$ (0<x<1, 0<y<1) or $Ba(Ti_{1-y}Zr_y)O_3$ (0<y<1), in which calcium (Ca), zirconium (Zr) or the like is partially dissolved in $BaTiO_3$.

In addition, the raw material of the dielectric layer 111 may be prepared by adding various ceramic additives, organic solvents, binders, dispersing agents and the like, to a powder such as the barium titanate ($BaTiO_3$) powder, based on an object of the present disclosure.

Meanwhile, an average thickness td of the dielectric layer 111 may not need to be particularly limited. For example, the average thickness td of the dielectric layer 111 may be 0.2 μm or more and 2 μm or less.

However, the multilayer electronic component may generally have lower reliability when the dielectric layer has a small thickness of less than 0.6 μm, in particular, when having a thickness of 0.45 μm or less.

According to an exemplary embodiment of the present disclosure, the internal electrode may have uniform connectivity and excellent smoothness, and the multilayer electronic component may thus secure excellent reliability even when 0.45 μm or less is the average thickness of the dielectric layer 111. Therefore, when 0.45 μm or less is the average thickness of the dielectric layer 111, the multilayer electronic component according to the present disclosure may have more remarkably improved reliability.

The average thickness td of the dielectric layer 111 may indicate the average thickness of the dielectric layer 111 disposed between the first and second internal electrodes 121 and 122.

The average thickness of the dielectric layer 111 may be measured by scanning an image of a cross-section of the body 110 in a length-thickness (L-T) direction (e.g., the second-first direction) by using the scanning electron microscope (SEM) with a magnification of 10,000. In more detail, an average thickness value of the dielectric layer may be obtained by measuring a thickness of one dielectric layer at thirty equally spaced points in the length direction in the scanned image. The thirty equally spaced points may be designated in the capacitance formation portion Ac. In addition, it is possible to obtain the more general average thickness of the dielectric layer when measuring its average value by extending a measurement target of the average value to ten dielectric layers. Other methods and/or tools appreciated by one of ordinary skill in the art, even if not described in the present disclosure, may also be used.

The body 110 may include the capacitance formation portion Ac disposed in the body 110 and including the plurality of internal electrodes 121 and 122 opposing each other in the first direction, while having the dielectric layer 111 interposed therebetween, and the cover portions 112 and 113 disposed on both the end surfaces of the capacitance formation portion Ac in the first direction.

In addition, the capacitance formation portion Ac may be a portion contributing to capacitance formation of the capacitor, and may be formed by repeatedly stacking the plurality of first and second internal electrodes 121 and 122 having the dielectric layer 111 interposed therebetween. In addition, the capacitance formation portion Ac may indicate a region in which the first and second internal electrodes 121 and 122 overlap each other.

The cover portions 112 and 113 may include the upper cover portion 112 disposed on an upper surface of the capacitance formation portion Ac in the first direction and the lower cover portion 113 disposed on a lower surface of the capacitance formation portion Ac in the first direction.

The upper cover portion 112 and the lower cover portion 113 may be formed by stacking one dielectric layer or two or more dielectric layers on the upper and lower surfaces of the capacitance formation portion Ac in the thickness direction, respectively, and may basically serve to prevent damage to the internal electrodes, caused by physical or chemical stress.

The upper and lower cover portions 112 and 113 may include no internal electrode and may include the same material as the dielectric layer 111.

That is, the upper and lower cover portions 112 and 113 may include a ceramic material such as a barium titanate ($BaTiO_3$)-based ceramic material.

Meanwhile, an average thickness of the cover portion 112 or 113 may not need to be particularly limited. However, 15 μm or less may be the average thickness of the cover portion 112 or 113 in order for the multilayer electronic component to more easily have the smaller size and the higher capacitance. The average thickness of the cover portion 112 or 113 may indicate its size in the first direction, and may have a value obtained by averaging the size of the upper cover portion 112 in the first direction, which is measured at five equally spaced points on an upper portion of the capacitance formation portion Ac or a value obtained by averaging the size of the lower cover portion in the first direction, which is measured at five equally spaced points on a lower portion of the capacitance formation portion Ac.

In addition, margin portions 114 and 115 may each be disposed on a side of the capacitance formation portion Ac.

The margin portions 114 and 115 may include the margin portion 114 disposed on the fifth surface 5 of the body 110 and the margin portion 115 disposed on the sixth surface 6 of the body 110. That is, the margin portions 114 and 115 may be disposed on both sides of the ceramic body 110 in the width direction (e.g., the third direction).

As shown in FIG. 3, the margin portions 114 and 115 may indicate a region between both ends of the first and second internal electrodes 121 and 122 and a boundary surface of the body 110 based on a cross-section of the body 110 cut in a width-thickness (W-T) direction (e.g., the third-first direction).

The margin portions 114 and 115 may basically serve to prevent the damage to the internal electrode, caused by the physical or chemical stress.

The margin portions 114 and 115 may be formed by forming the internal electrode by applying a conductive paste on a ceramic green sheet except its portion where the margin portion is to be positioned.

Alternatively, in order to suppress a step difference occurring due to the internal electrodes 121 and 122, the margin portions 114 and 115 may be formed by stacking the internal electrodes on each other, then cutting the internal electrodes to be exposed to the fifth and sixth surfaces 5 and 6 of the body, and then stacking one dielectric layer or two or more dielectric layers on the both sides of the capacitance formation portion Ac in the width direction.

The internal electrodes 121 and 122 may be alternately stacked on each other interposing the dielectric layer 111 therebetween.

The internal electrodes 121 and 122 may include the first internal electrode 121 and the second internal electrode 122, which have polarities different from each other, and the first and second internal electrodes 121 and 122 may be alternately disposed in the first direction, while having the dielectric layer 111 interposed therebetween.

Referring to FIG. 2, the first internal electrode 121 may be spaced apart from the fourth surface 4 of the body 110 and exposed to the third surface 3, and the second internal electrode 122 may be spaced apart from the third surface 3 of the body 110 and exposed to the fourth surface 4. The external electrodes 131 and 132 may respectively be disposed on the third surface 3 and fourth surface 4 of the body 110 to respectively be connected to the internal electrodes 121 and 122.

Here, the first and second internal electrodes 121 and 122 may be electrically insulated from each other by the dielectric layer 111 interposed therebetween.

Referring to FIG. 4, the body 110 may be formed by alternately stacking the ceramic green sheet on which the first internal electrode 121 is printed and the ceramic green sheet on which the second internal electrode 122 is printed on each other and then sintering the same.

The internal electrodes 121 and 122 may be stacked in 400 or more layers to implement the multilayer electronic component having the higher capacitance, and is not necessarily limited thereto.

SL may be 5.5 area % or less in which SL indicates the ratio of the area of NL to the area of ML, ML indicates the region excluding 35 μm at both the ends of the capacitance formation portion Ac in the second direction, and positioned at the center of the region in which the cross-section of the body in the first-second direction is divided into thirds in the first direction, and NL indicates the region of ML in which 110% or more and 126% or less is the range of the brightness intensity compared to the average value of the brightness intensity of the cover portion. It is possible to secure the uniform connectivity of the internal electrode by controlling SL to 5.5 area % or less, and to suppress occurrence of the short circuit between the internal electrodes, the lower capacitance, the reduced breakdown voltage or the like by improving the smoothness of the internal electrode 121 or 122.

Figure 7:
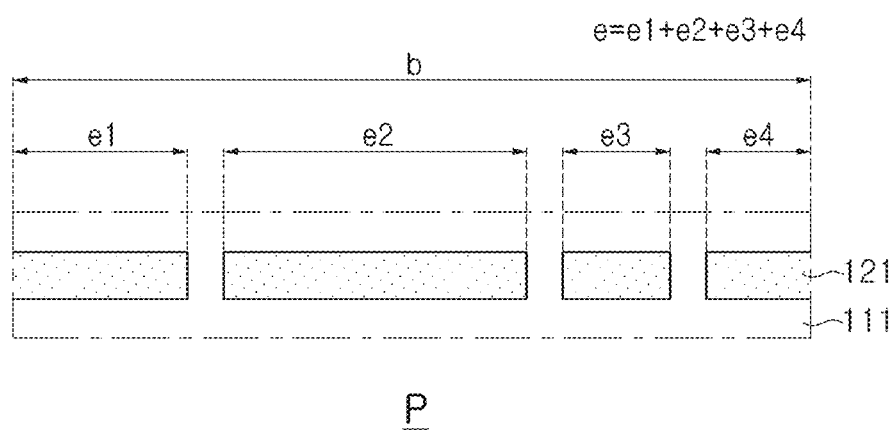
FIG. 7 is an enlarged view of a region "P" of FIG. 2 for explaining connectivity of an internal electrode.

Here, the connectivity of the internal electrode may indicate a ratio of a length of a portion in which the internal electrode is actually formed to a length of the internal electrode. For example, as shown in FIG. 7, the connectivity of the internal electrode may be expressed by a ratio of a sum ($e=e1+e2+e3+e4$) of lengths of the portions in each of which the electrode is actually formed to a total length "b" of the electrode when "b" indicates the total length of the electrode, measured at any one point of the internal electrode 121, and each of e1, e2, e3 and e4 indicates the length of the portion in which the electrode is actually formed. The smoothness may indicate a degree to which a surface of the internal electrode 121 or 122 is flat, and it may be determined that the internal electrode 121 or 122 has higher smoothness as having more uniform thickness.

When SL is more than 5.5 area %, the internal electrode may have the non-uniform connectivity, and the internal electrode may thus have poor connectivity and lower smoothness.

The region in which 110% or more and 126% or less is the range of the brightness intensity compared to the average value of the brightness intensity of the cover portion 112 or 113 may be a region in which the internal electrode 121 or 122 has the non-uniform connectivity or the smaller thickness. The capacitance formation portion Ac may include the internal electrodes 121 and 122, and may thus be observed brighter than the cover portions 112 and 113 when viewed using a tool microscope. However, a region of the capacitance formation portion Ac, in which the internal electrode 121 and 122 has the poor connectivity or the smaller thickness may be observed relatively dark, and the problem such as the short circuit between the internal electrodes, the lower capacitance, the reduced breakdown voltage or the like may occur in the region in which 110% or more and 126% or less is the range of the brightness intensity compared to the average value of the brightness intensity of the cover portion.

Figure 16:
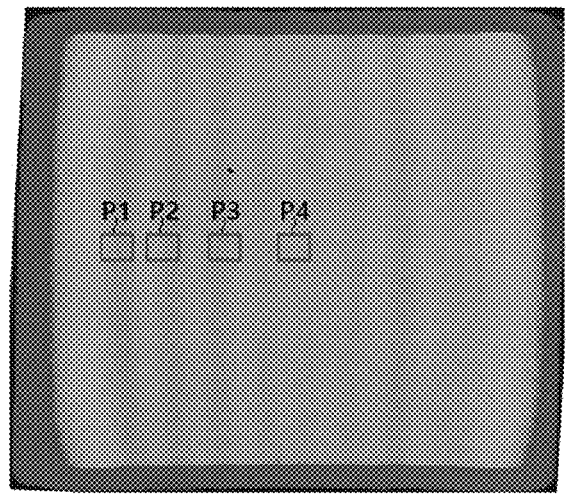
FIG. 16 is an image obtained by observing a cross-section of Test No. 5 in a first-third direction by using the tool microscope.
Figure 17:
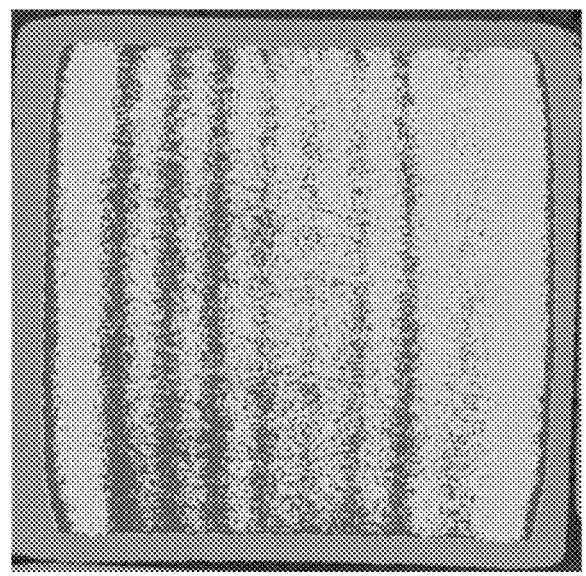
FIG. 17 is an image obtained by analyzing the image of FIG. 16 by using SigmaScan Pro.

In addition, the uniform connectivity and smoothness of the internal electrode may be greatly affected by smoothness of an internal electrode pattern, and the internal electrodes included in one capacitor may be generally formed by stacking the ceramic green sheets on each of which the internal electrode pattern is printed by the same printing method. The regions in each of which the internal electrode pattern has lower smoothness may thus overlap each other in a stack direction (i.e. first direction). Accordingly, the region in which 110% or more and 126% or less is the range of the brightness intensity compared to the average value of the brightness intensity of the cover portion may form a line in the stack direction, and such a defect may be referred to as a line defect. Referring to FIGS. 16 and 17, it may be confirmed that the region in which 110% or more and 126% or less is the range of the brightness intensity compared to the average value of the brightness intensity of the cover portion clearly forms the line in the stack direction, and the line defect thus occurs. Hereinafter, the line defect may indicate the region in which 110% or more and 126% or less is the range of the brightness intensity compared to the average value of the brightness intensity of the cover portion, and the occurrence of the line defect may indicate that more than 5.5 area % is a range of the area fraction of the region in which 110% or more and 126% or less is the range of the brightness intensity compared to the average value of the brightness intensity of the cover portion.

Further, the stack number of internal electrodes 121 and 122 and dielectric layers 111 may be gradually increased as the multilayer electronic component 100 has the smaller size and the higher capacitance. Therefore, required is a lot of effort and time to quantitatively analyze the connectivity and smoothness of the internal electrode included in the multilayer electronic component. However, according to an exemplary embodiment of the present disclosure, it is possible to determine whether the internal electrode 121 or 122 entirely has the uniform connectivity, and whether the internal electrode 121 or 122 entirely has the excellent smoothness by measuring the area fraction of the region in which 110% or more and 126% or less is the range of the brightness intensity compared to the average value of the brightness intensity of the cover portion 112 or 113. Therefore, it may be guaranteed that the internal electrode 121 or 122 included in the multilayer electronic component 100 entirely has excellent connectivity and the excellent smoothness by using a simple measurement method.

The brightness intensity (Intensity of Brightness) may be a value expressed as intensity when analyzing an image captured using an optical microscope by using an image analysis program, and may be a numerical value expressing brightness as a relative value. The image analysis program may be SigmaScan Pro, Olympus Stream Essentials 2.4 or the like, and the intensity may have a value in the range of zero to 255.

Hereinafter, the description describes a specific example of a method of measuring the average value of the brightness intensity of the cover portion and SL. However, it needs to be noted that the method of measuring the brightness intensity is not limited thereto.

Figure 8:
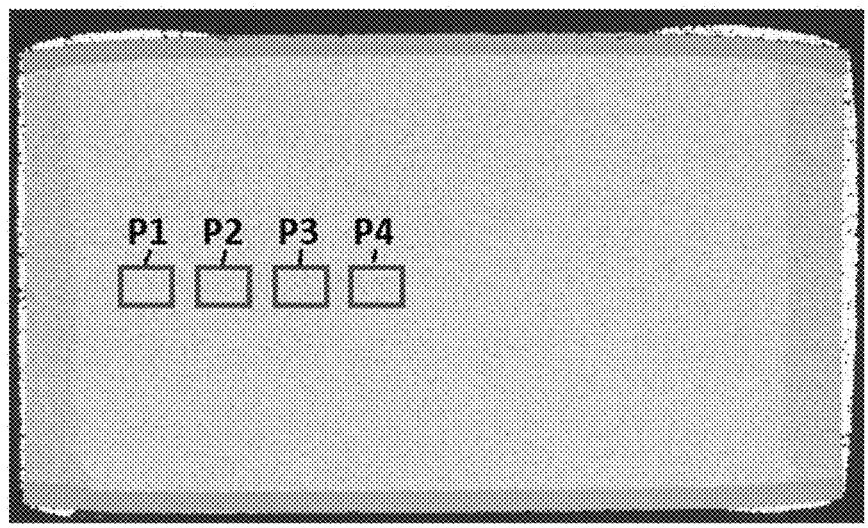
FIG. 8 is an image obtained by observing a cross-section of Test No. 1 in a first-second direction by using a tool microscope.
Figure 13:
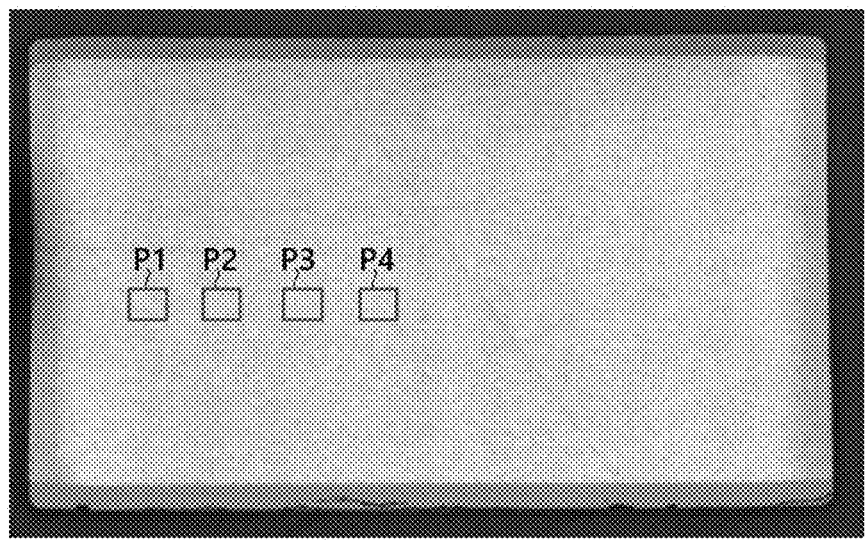
FIG. 13 is an image obtained by observing a cross-section of Test No. 4 in a first-second direction by using the tool microscope.

First, it is possible to store an optical image of the cross-section of the body in the first-second direction, observed using the tool microscope with a magnification of 100 after polishing the body 110 to its center in the third direction to expose its cross-section in the first-second direction. Here, the tool microscope may not need to be limited to a particular type, and use Olympus BX53M equipped with Olympus Stream Essentials 2.4. The brightness intensity of the observed optical image may depend on an observation environment. It is thus possible to more easily analyze and compare the brightness intensity of the cover portion and the brightness intensity of the capacitance formation portion by using SigmaScan Pro when the observation environment is adjusted so that the brightness intensity of the cover portion in the optical image has intensity of 100 or more and 130 or less. FIGS. 8 and 13 show optical images obtained using Olympus BX53M by the above-described method. Meanwhile, it is possible to check the brightness intensity by using the program such as Olympus Stream Essentials 2.4, SigmaScan Pro or the like, and the brightness intensity may be expressed as intensity in these programs.

Figure 9:
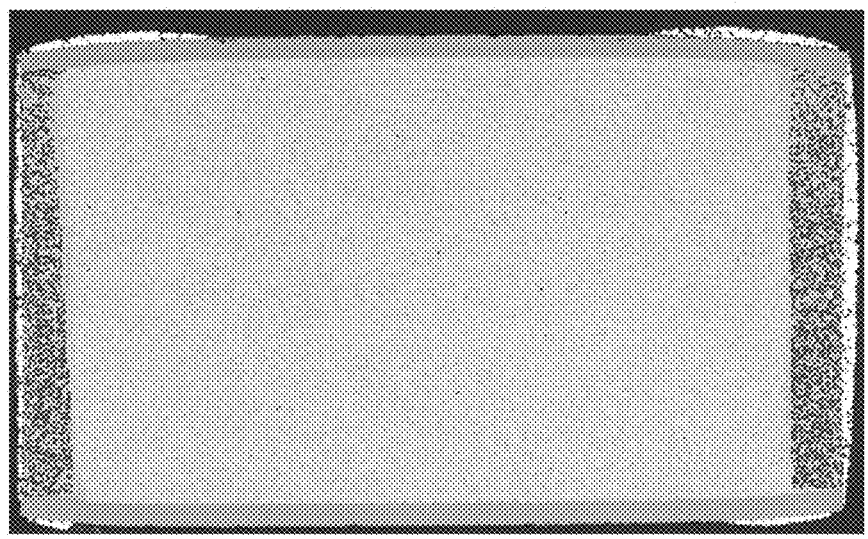
FIG. 9 is an image obtained by analyzing the image of FIG. 8 by using SigmaScan Pro.
Figure 14:
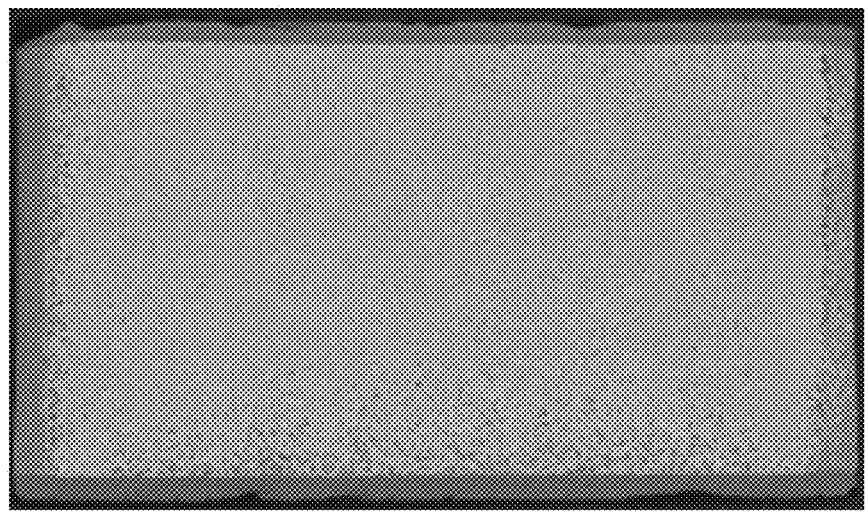
FIG. 14 is an image obtained by analyzing the image of FIG. 13 by using SigmaScan Pro.

The optical image may then be analyzed using SigmaScan Pro. SigmaScan Pro is a program that provides an image analysis package to study the structure and size of visual information. It is possible to perform image conversion of the optical image through 'convert to gray scale' in a menu of SigmaScan Pro. It is then possible to set 'line Intensity of Trace Measurement' in the menu of SigmaScan Pro, and then measure the average value of the brightness intensity of the cover portion 112 or 113 in a region MC of FIG. 5. It is then possible to obtain SL by setting the region in which 110% or more and 126% or less is the range of the brightness intensity compared to the average value of the brightness intensity of the cover portion 112 or 113 to be marked in a specific color and then measuring an area fraction of a region marked in the specific color in a total area of ML. FIGS. 9 and 14 show optical images obtained using SigmaScan Pro by the above-described method, and the region in which 110% or more and 126% or less is the range of the brightness intensity compared to the average value of the brightness intensity of the cover portion 112 or 113 is marked in red.

Referring to FIG. 5, ML may indicate the region excluding 35 μm (D1) at both the ends of the capacitance formation portion Ac in the second direction, and positioned at the center of the region in which the cross-section of the body 110 in the first-second direction is divided into thirds in the first direction. The measurement region may be limited in this way to exclude a region which may be affected by the cover portion 112 or 113 or by a margin portion in the length direction. Here, the capacitance formation portion Ac may indicate a region in which the first internal electrode 121 and the second internal electrode 122 overlap each other, and exclude a region in which the first and second internal electrodes do not overlap each other from a region from the internal electrode disposed at an uppermost portion in the first direction to the internal electrode disposed at a lowermost portion in the first direction. One end of the capacitance formation portion Ac in the second direction may indicate a region in which ends of the second internal electrodes 122, spaced apart from the third surface, are connected to each other in the first direction, and the other end of the capacitance formation portion Ac may indicate a region in which the other ends of the second internal electrodes 122, spaced apart from the fourth surface, are connected to each other in the first direction.

In addition, the average value of the brightness intensity of the cover portion 112 or 113 may be a value measured in the region MC positioned in a center of a region in which the cover portion 112 or 113 is divided into thirds in the second direction, or a value measured in a region including two portions positioned in a center of a region in which the cover portion 112 or 113 is divided into quarters in the first direction to exclude a region adjacent to an outer side portion of the body and to the capacitance formation portion Ac.

Meanwhile, SL may not have any particular lower limit because the internal electrode 121 or 122 may secure more uniform connectivity and more improved smoothness as SL has a smaller value.

In an exemplary embodiment, SW may be 5.5 area % or less in which SW indicates a ratio of an area of NW to an area of MW, MW indicates a region excluding 35 μm at both ends of the capacitance formation portion Ac in the third direction, and positioned in a center of a region in which a cross-section of the body in a first-third direction is divided into thirds in the first direction, and NW indicates a region of MW in which 110% or more and 126% or less is a range of brightness intensity compared to the average value of the brightness intensity of the cover portion 112 or 113. It is possible to secure the uniform connectivity of the internal electrode by controlling SW to 5.5 area % or less, and to suppress occurrence of the short circuit between the internal electrodes, the lower capacitance, the reduced breakdown voltage or the like by improving the smoothness of the internal electrode 122 or 121. When SW is more than 5.5 area %, the internal electrode may have the non-uniform connectivity, and the internal electrode may thus have the poor connectivity and the lower smoothness.

Hereinafter, the description describes a specific example of a method of measuring the average value of the brightness intensity of the cover portion 112 or 113 and SW. However, it needs to be noted that the method of measuring the brightness intensity is not limited thereto.

Figure 11:
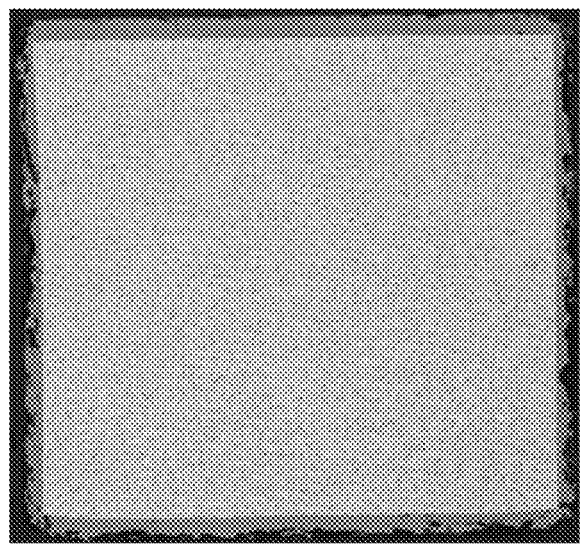
FIG. 11 is an image obtained by observing a cross-section of Test No. 1 in a first-third direction by using the tool microscope.

First, it is possible to store an optical image of the cross-section of the body in the first-third direction, observed using the tool microscope with a magnification of 100 after polishing the body 110 to its center in the second direction to expose its cross-section in the first-third direction. FIGS. 11 and 16 show optical images obtained using Olympus BX53M by the above-described method.

Figure 12:
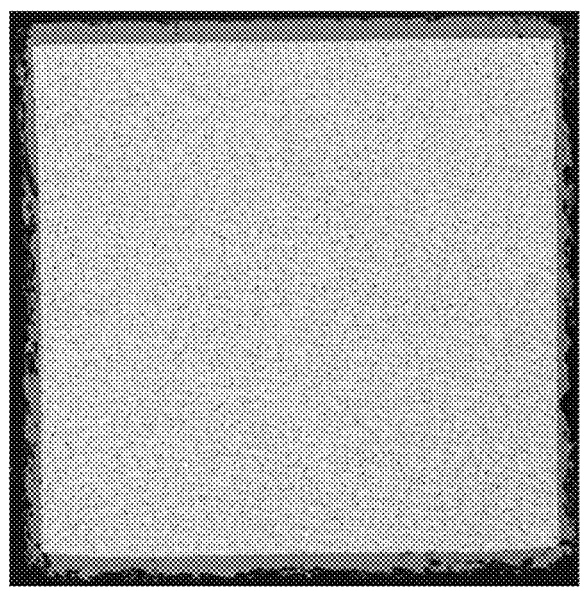
FIG. 12 is an image obtained by analyzing the image of FIG. 11 by using SigmaScan Pro.

It is then possible to perform image conversion of the optical image through 'convert to gray scale' in the menu of SigmaScan Pro. It is possible to set 'line Intensity of Trace Measurement' in the menu of SigmaScan Pro, and then measure the average value of the brightness intensity of the cover portion 112 or 113 in a region MC' of FIG. 6. It is then possible to obtain SW by setting the region in which 110% or more and 126% or less is the range of the brightness intensity compared to the average value of the brightness intensity of the cover portion 112 or 113 to be marked in a specific color and then measuring an area fraction of a region marked in the specific color in a total area of MW. FIGS. 12 and 17 show optical images obtained using SigmaScan Pro by the above-described method, and the region in which 110% or more and 126% or less is the range of the brightness intensity compared to the average value of the brightness intensity of the cover portion 112 or 113 is marked in red.

Referring to FIG. 6, MW may indicate the region excluding 35 μm (D2) at both the ends of the capacitance formation portion Ac in the third direction, and positioned at the center of the region in which the cross-section of the body 110 in the first-third direction is divided into thirds in the first direction. The measurement region may be limited in this way to exclude a region which may be affected by the cover portion 112 or 113 or by the margin portion 114 or 115 in the width direction.

In addition, the average value of the brightness intensity of the cover portion 112 or 113 may be a value measured in the region MC' positioned in a center of a region in which the cover portion 112 or 113 is divided into thirds in the third direction, or a value measured in a region including two portions positioned in a center of a region in which the cover portion 112 or 113 is divided into quarters in the first direction to exclude a region adjacent to an outer side portion of the body and to the capacitance formation portion Ac.

Meanwhile, SW may not have any particular lower limit because the internal electrode 121 or 122 may secure the more uniform connectivity and the more improved smoothness as SW has the smaller value.

In an exemplary embodiment, both SL and SW may be 5.5 area % or less.

The line defect may be observed in only one of one cross-section of the body in the first-second direction and one cross-section of the body in the first-third direction. Therefore, it may be guaranteed more clearly whether the internal electrode 121 or 122 entirely has the uniform connectivity and the excellent smoothness by lowering the area fraction of the region in which 110% or more and 126% or less is the range of the brightness intensity compared to the average value of the brightness intensity of the cover portion, based on both the cross-section of the body in the first-second direction and the cross-section of the body in the first-third direction.

In an exemplary embodiment, 5.5 area % or less may be a range of SL measured at all of three equally spaced points of the body 110 in the third direction, based on three cross-sections of the body cut in the first-second direction.

SL may have a low value when measured only in one cross-section of the body in the first-second direction in a case where the line defect is observed only in the cross-section of the body in the first-third direction. Therefore, it may be guaranteed more clearly whether the internal electrode 121 or 122 entirely has the uniform connectivity and the excellent smoothness when 5.5 area % or less is the range of SL measured at all the three cross-sections of the body 110 in the first-second direction, obtained by cutting the body at the three equally spaced points in the third direction.

In an exemplary embodiment, 5.5 area % or less may be a range of SW measured at all of three equally spaced points of the body 110 in the second direction, based on three cross-sections of the body cut in the first-third direction.

SW may have a low value when measured only in one cross-section of the body in the first-third direction in a case where the line defect is observed only in the cross-section of the body in the first-second direction. Therefore, it may be guaranteed more clearly whether the internal electrode 121 or 122 entirely has the uniform connectivity and the excellent smoothness when 5.5 area % or less is the range of SW measured at all the three cross-sections of the body 110 in the first-third direction, obtained by cutting the body at the three equally spaced points in the second direction.

In an exemplary embodiment, 80% or more may be a range of an average value of the connectivity of the internal electrode 121 or 122 disposed in ML. That is, 80% or more may be the range of the average value of the connectivity of the internal electrode measured in ML. When the average value of the connectivity of the internal electrode is excessively low, the capacitor may have the lower reliability and the reduced capacitance even though the internal electrode entirely has the uniform connectivity. Accordingly, 80% or more may be the range of the average value of the connectivity of the internal electrode disposed in ML.

Here, the connectivity of the internal electrode may indicate the ratio of the length of the portion where the internal electrode is actually formed to the length of the internal electrode. For example, as shown in FIG. 7, the connectivity of the internal electrode may be expressed by the ratio of the sum (e=e1+e2+e3+e4) of the lengths of the portions in each of which the electrode is actually formed to the total length "b" of the electrode when "b" indicates the total length of the electrode, measured at any one point of the internal electrode 121, and each of e1, e2, e3 and e4 indicates the length of the portion in which the electrode is actually formed.

In an exemplary embodiment, 1.3% or less may be a range of a standard deviation of the connectivity of the internal electrode disposed in ML. That is, 1.3% or less may be the range of the standard deviation of the connectivity of the internal electrode measured in ML. When 1.3% or less is the range of the standard deviation of the connectivity of the internal electrode, the internal electrode may have the uniform connectivity, and it is thus possible to suppress the occurrence of the short circuit between the internal electrodes, the lower capacitance, the reduced breakdown voltage or the like.

In an exemplary embodiment, 1.8% or less may be a range of a value of coefficient of variation (CV) of the connectivity of the internal electrode disposed in ML. That is, 1.8% or less may be the range of the value of the CV of the connectivity of the internal electrode measured in ML. When 1.8% or less is the range of the value of the CV of the connectivity of the internal electrode, the internal electrode may have the uniform connectivity, and it is thus possible to suppress the occurrence of the short circuit between the internal electrodes, the lower capacitance, the reduced breakdown voltage or the like.

In an exemplary embodiment, 80% or more may be a range of an average value of the connectivity of the internal electrode 121 or 122 disposed in MW. That is, 80% or more may be the range of the average value of the connectivity of the internal electrode measured in MW. When the average value of the connectivity of the internal electrode is excessively low, the capacitor may have the lower reliability and the reduced capacitance even though the internal electrode entirely has the uniform connectivity. Accordingly, 80% or more may be the range of the average value of the connectivity of the internal electrode disposed in MW.

In an exemplary embodiment, 1.3% or less may be a range of a standard deviation of the connectivity of the internal electrode disposed in MW. That is, 1.3% or less may be the range of the standard deviation of the connectivity of the internal electrode measured in MW. When 1.3% or less is the range of the standard deviation of the connectivity of the internal electrode, the internal electrode may have the uniform connectivity, and it is thus possible to suppress the occurrence of the short circuit between the internal electrodes, the lower capacitance, the reduced breakdown voltage or the like.

In an exemplary embodiment, 1.8% or less may be a range of a value of coefficient of variation (CV) of the connectivity of the internal electrode disposed in MW. That is, 1.8% or less may be the range of the value of the CV of the connectivity of the internal electrode measured in MW. When 1.8% or less is the range of the value of the CV of the connectivity of the internal electrode, the internal electrode may have the uniform connectivity, and it is thus possible to suppress the occurrence of the short circuit between the internal electrodes, the lower capacitance, the reduced breakdown voltage or the like.

Methods for measuring the average value, standard deviation, and the value of the CV for the connectivity of the internal electrode are not particularly limited. For a specific example, the average value of the connectivity of the internal electrode disposed in MW may be obtained by measuring values of the connectivity of each internal electrode in any four regions P1, P2, P3 and P4, each having a size of 70 μm×90 μm in MW, and then arithmetically averaging the measured values. In addition, the standard deviation and the value of the CV for the value of the connectivity of each electrode in the four regions may be the standard deviation and the value of the CV value of the connectivity of the internal electrode. Here, the standard deviation may be a value obtained using STDEVP function in Microsoft Excel program, and the value (%) of the CV may be obtained by '(standard deviation/average)×100'.

Meanwhile, a material used for forming the internal electrode 121 or 122 is not particularly limited, and may be a material having excellent electrical conductivity. For example, the internal electrode 121 or 122 may include at least one of nickel (Ni), copper (Cu), palladium (Pd), silver (Ag), gold (Au), platinum (Pt), tin (Sn), tungsten (W), titanium (Ti) and an alloy thereof.

In addition, the internal electrodes 121 and 122 may be formed by printing, on the ceramic green sheet, a conductive paste for internal electrodes including at least one of nickel (Ni), copper (Cu), palladium (Pd), silver (Ag), gold (Au), platinum (Pt), tin (Sn), tungsten (W), titanium (Ti) and an alloy thereof. A method of printing the conductive paste for the internal electrodes may be a screen printing method, the gravure printing method or the like, and the present disclosure is not limited thereto.

In addition, an average thickness te of the internal electrode 121 or 122 may not need to be particularly limited. For example, the average thickness te of the internal electrode 121 or 122 may be 0.2 μm or more and 2 μm or less.

However, the multilayer electronic component may generally have the lower reliability when the internal electrode has a small thickness of less than 0.6 μm, in particular, when having a thickness of 0.4 μm or less.

According to an exemplary embodiment of the present disclosure, the internal electrode may have the uniform connectivity and the excellent smoothness, and the multilayer electronic component may thus secure the excellent reliability even when 0.4 μm or less is the average thickness of the internal electrode 121 or 122.

Therefore, when 0.4 μm or less is the average thickness of the internal electrode 121 or 122, the multilayer electronic component according to the present disclosure may have the more remarkably improved reliability, and may thus more easily have the smaller size and the higher capacitance.

The average thickness te of the internal electrode 121 or 122 may indicate the average thickness of the internal electrode 121 or 122.

The average thickness of the internal electrode 121 or 122 may be measured by scanning an image of the cross-section of the body 110 in the length-thickness (L-T) direction by using the scanning electron microscope (SEM) with a magnification of 10,000. In more detail, the average value of the internal electrode may be obtained by measuring a thickness of one internal electrode at thirty equally spaced points in the length direction in the scanned image. The thirty equally spaced points may be designated in the capacitance formation portion Ac. In addition, it is possible to obtain the more general average thickness of the internal electrode when measuring its average value by extending a measurement target of the average value to ten internal electrodes.

The external electrodes 131 and 132 may respectively be disposed on the third surface 3 and fourth surface 4 of the body 110.

The external electrodes 131 and 132 may respectively disposed on the third and fourth surfaces 3 and 4 of the body 110, and may include the first and second external electrodes 131 and 132 respectively connected to first and second internal electrodes 121 and 122.

Referring to FIG. 1, the external electrode 131 or 132 may be disposed to cover both end surfaces of the side margin portions 114 and 115 in the second direction.

This exemplary embodiment describes that the multilayer electronic component 100 includes two external electrodes 131 and 132. However, the number, shape or the like of the external electrode 131 or 132 may depend on a shape of the internal electrode 121 or 122 or another purpose.

Meanwhile, the external electrode 131 or 132 may be made of any material having electrical conductivity, such as a metal, may use a specific material determined in consideration of electrical characteristics, structural stability or the like, and may have a multilayer structure.

For example, the external electrodes 131 and 132 may each include electrode layers 131a and 132a disposed on the body 110 and plating layers 131b and 132b respectively formed on the electrode layers 131a and 132a.

As a more specific example of the electrode layer 131a or 132a, the electrode layer 131a or 132a may be a fired electrode including a conductive metal and glass, or a resin-based electrode including the conductive metal and a resin.

In addition, the electrode layer 131a or 132a may have a shape in which the fired electrode and the resin-based electrode are sequentially formed on the body. In addition, the electrode layer 131a or 132a may be formed by transferring a sheet including the conductive metal to the body or by transferring the sheet including the conductive metal to the fired electrode.

The electrode layer 131a or 132a may also be formed using an atomic layer deposition (ALD) method, a molecular layer deposition (MLD) method, a chemical vapor deposition (CVD) method, a sputtering method, etc.

The conductive metal used for the electrode layer 131a or 132a is not particularly limited as long as the conductive metal is the material which may be electrically connected to the internal electrode to form the capacitance. For example, the conductive metal may include at least one selected from the group consisting of nickel (Ni), copper (Cu), palladium (Pd), silver (Ag), gold (Au), platinum (Pt), tin (Sn), tungsten (W), titanium (Ti) and an alloy thereof.

The plating layer 131b or 132b may serve to improve a mount characteristic of the multilayer electronic component.

The plating layer 131b or 132b is not limited to a particular type, may include at least one of nickel (Ni), tin (Sn), palladium (Pd) and an alloy thereof, or may include a plurality of layers.

As a more specific example of the plating layer 131b or 132b, the plating layer 131b or 132b may include a nickel (Ni) plating layer or a tin (Sn) plating layer, may include the Ni plating layer and the Sn plating layer sequentially formed on the electrode layer 131a or 132a, or may include the Sn plating layer, the Ni plating layer and the Sn plating layer sequentially formed on the electrode layer 131a or 132a. Alternatively, the plating layer 131b or 132b may include the plurality of Ni plating layers and/or the plurality of Sn plating layers.

The multilayer electronic component 100 may not need to be limited to a particular size.

However, in order for the multilayer electronic component to have the smaller size and simultaneously have the higher capacitance, it is necessary to increase the number of stacks by allowing the dielectric layer and the internal electrode to each have a smaller thickness. The multilayer electronic component 100 having a size of 0603 (i.e. length× width of 0.6 mm×0.3 mm) or less may thus have more remarkably improved reliability and breakdown voltage according to the present disclosure.

Therefore, in consideration of a manufacturing error, a size of the external electrode and the like, when having a length of 0.66 mm or less and a width of 0.33 mm or less, the multilayer electronic component 100 may have the more remarkably improved reliability according to the present disclosure. Here, the length of the multilayer electronic component 100 may indicate a maximum size of the multilayer electronic component 100 in the second direction, and the width of the multilayer electronic component 100 may indicate a maximum size of the multilayer electronic component 100 in the third direction.

Meanwhile, according to another exemplary embodiment of the present disclosure, the multilayer electronic component may include: a body 100 including first and second surfaces 1 and 2 opposing each other in a first direction, third and fourth surfaces 3 and 4 connected to the first and second surfaces 1 and 2 and opposing each other in a second direction, and fifth and sixth surfaces 5 and 6 connected to the first to fourth surfaces 1 to 4 and opposing each other in a third direction, and including a capacitance formation portion Ac including a plurality of dielectric layers 111 and a plurality of internal electrodes 121 and 122 alternately disposed in the first direction, while having the dielectric layer interposed therebetween, and cover portions 112 and 113 disposed on both end surfaces of the capacitance formation portion in the first direction; and external electrodes 131 and 132 disposed on the body. 1.3% or less may be a range of a standard deviation of connectivity of the internal electrode measured in ML in which ML indicates a region excluding 35 μm at both ends of the capacitance formation portion Ac in the second direction, and positioned in a center of a region in which a cross-section of the body in a first-second direction is divided into thirds in the first direction, and the connectivity of the internal electrode indicates a ratio of a length of a portion in which the internal electrode is actually formed to a length of the internal electrode.

In another exemplary embodiment, 1.3% or less may be a range of a standard deviation of connectivity of the internal electrode measured in MW in which MW indicates a region excluding 35 μm at both ends of the capacitance formation portion in the third direction, and positioned in a center of a region in which a cross-section of the body in a first-third direction is divided into thirds in the first direction.

A line defect may be observed in only one of one cross-section of the body in the first-second direction and one cross-section of the body in the first-third direction. Therefore, it may be guaranteed more clearly whether the internal electrode 121 or 122 entirely has the uniform connectivity and the excellent smoothness by setting 1.5 or less to the range of the standard deviation of the connectivity of the internal electrode in ML or MW, and it is thus possible to suppress the occurrence of the short circuit between the internal electrodes, the lower capacitance, the reduced breakdown voltage or the like.

In another exemplary embodiment, 80% or more may be a range of an average value of the connectivity of the internal electrode 121 or 122 disposed in ML or MW.

In another exemplary embodiment, 1.8% or less may be a range of a value of coefficient of variation (CV) of the connectivity of the internal electrode disposed in ML or MW.

In another exemplary embodiment, SL or SW may be 5.5 area % or less in which SL indicates a ratio of an area of NL to an area of ML, and NL indicates a region of ML in which 110% or more and 126% or less is a range of brightness intensity compared to an average value of brightness intensity of the cover portion, and SW indicates a ratio of an area of NW to an area of MW, and NW indicates a region of MW in which 110% or more and 126% or less is a range of brightness intensity compared to the average value of the brightness intensity of the cover portion 112 or 113.

Manufacturing Method of Multilayer Electronic Component

The description describes a manufacturing method in which the multilayer electronic component according to another exemplary embodiment of the present disclosure is more easily manufactured with shorter manufacturing time and in mass production.

However, it needs to be noted that the manufacturing method of the multilayer electronic component according to another exemplary embodiment of the present disclosure described above is not limited to the manufacturing method described below.

Figure 20:
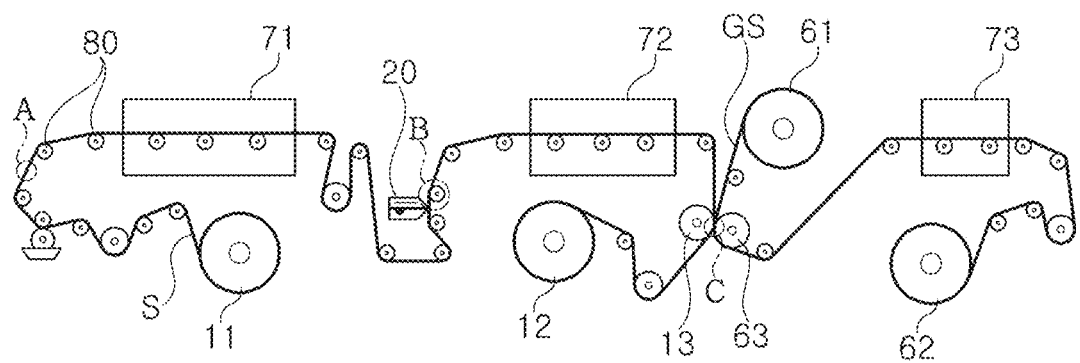
FIG. 20 is a view schematically showing a method of manufacturing a multilayer electronic component according to another exemplary embodiment of the present disclosure.
Figure 21:
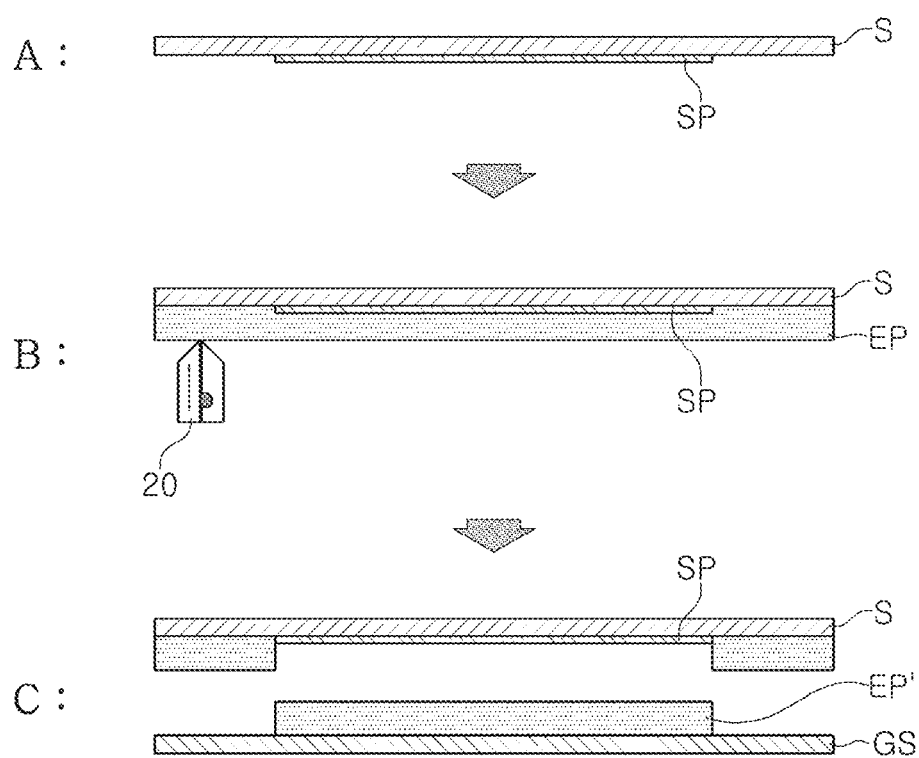
FIG. 21 is an enlarged schematic view of regions "A", "B" and "C" of FIG. 20.

FIG. 20 is a view schematically showing the manufacturing method of a multilayer electronic component according to another exemplary embodiment of the present disclosure;

FIG. 21 is an enlarged schematic view of regions "A", "B" and "C" of FIG. 20.

The manufacturing method of a multilayer electronic component according to another exemplary embodiment of the present disclosure is described with reference to FIGS. 20 and 21.

The manufacturing method of a multilayer electronic component according to another exemplary embodiment of the present disclosure may include: coating a silicone pattern SP on a continuously supplied polymer sheet "S"; applying a paste EP for an internal electrode on the polymer sheet "S" on which the silicone pattern SP is coated; transferring the paste EP for an internal electrode, disposed on the silicone pattern SP to a continuously supplied ceramic green sheet GS to print the internal electrode pattern EP' on the ceramic green sheet GS; forming a stack body by stacking the ceramic green sheets GS on each of which the internal electrode pattern EP' is printed; cutting the stack body to obtain a unit stack body; sintering the unit stack body to obtain a sintered body; and forming an external electrode on the body to obtain the multilayer electronic component.

A conventional method of printing the internal electrode pattern on the ceramic green sheet may include a gravure printing, a screen printing, etc. However, the conventional printing method has a limitation in uniformly and smoothly printing the internal electrode pattern. In particular, this limitation may become larger as the thickness of the inner electrode is gradually smaller.

According to the present disclosure, it is possible to print the internal electrode pattern EP' uniformly and smoothly by applying the coating off-set printing method, and thus to print the internal electrode pattern uniformly and smoothly even though the internal electrode pattern has the smaller thickness.

Unlike the gravure printing and the screen printing, the coating off-set printing may coat the silicone pattern SP on a surface of the sheet S, and then apply the paste EP' for an internal electrode on the entire surface of the polymer sheet PS on which the silicone pattern SP is coated rather than use a design having a mesh mask or a halftone dot, thus making the paste be applied uniformly and smoothly.

Hereinafter, the description describes each process of the manufacturing method according to another exemplary embodiment of the present disclosure.

The Coating of the Silicone Pattern

The silicone pattern SP may be coated on the continuously supplied polymer sheet "S".

When forming the pattern using silicon (Si), it is possible to form the silicone pattern SP having a thickness of 10 nm or less, which is advantageous for transferring the internal electrode pattern EP' having a small thickness.

In addition, one silicone pattern SP may be transferred once. Accordingly, the sheet "S" and the silicone pattern SP may not be reused, thus requiring no separate cleaning and improving the uniformity and smoothness of the internal electrode pattern EP'.

A method of continuously supplying the polymer sheet "S" may not need to be particularly limited. In another exemplary embodiment, the polymer sheet "S" may be continuously supplied by being moved from a roll 11 on which the sheet is wound to a roll 12 rewinding the polymer sheet "S".

Here, the polymer sheet "S" may be a polyethylene terephthalate (PET) film on which the silicone pattern is easily coated.

A method of coating silicone pattern SP on the polymer sheet "S" may not need to be particularly limited. For example, when using a roll-to-roll inkjet method, silicone ink may be sprayed through a nozzle to the polymer sheet "S", and then dried on the sheet to allow a desired pattern to be coated on the sheet.

The polymer sheet may be stably supplied because a transfer roll 80 is disposed in an intermediate region in which the polymer sheet is moved from the roll 11 on which the polymer sheet is wound to the roll 12 rewinding the polymer sheet. Referring to FIGS. 12 and 13, the polymer sheet "S" on which the silicone pattern SP is coated may be moved using the transfer roll 80 from a region A to a region B where the paste for an internal electrode is applied. Here, a drying device 71 may be provided between the regions A and B to dry the silicone pattern SP.

The Applying of the Paste for an Internal Electrode

The paste EP for an internal electrode may then be applied to the polymer sheet "S" which is continuously supplied and on which the silicone pattern SP is coated, in the region B.

A method of applying the paste EP for an internal electrode may not be particularly limited. For example, the paste EP for an internal electrode may be applied using a die coater 20. The die coater 20 may apply the paste EP for an internal electrode to the polymer sheet "S" through a slit, and a distance between the die coater 20 and the polymer sheet "S" may be adjusted to adjust a thickness of the paste EP for an internal electrode applied to the polymer sheet "S".

Referring to FIGS. 20 and 21, the polymer sheet "S" on which the paste EP for an internal electrode is coated may be moved using the transfer roll 80 from the region B to a region C where the internal electrode pattern is printed.

Meanwhile, residues of the paste EP for an internal electrode may occur on the silicone pattern SP when the paste EP for an internal electrode is transferred in a wet state with a lot of solvent. There may thus be a risk that the internal electrode pattern EP' has lower uniformity and smoothness. Accordingly, a drying device 72 for drying the paste EP for an internal electrode may be provided between the region B and the region C to dry the paste EP for an internal electrode. It is thus possible to minimize fluidity of the paste EP for an internal electrode, and the internal electrode pattern EP' may thus have the improved uniformity and smoothness.

The Printing of the Internal Electrode Pattern

In the region C, the paste EP for an internal electrode, disposed on the silicone pattern SP may then be transferred to the continuously supplied ceramic green sheet GS to print the internal electrode pattern EP' on the ceramic green sheet.

The ceramic green sheet GS may be continuously supplied by being moved from a roll 61 on which the ceramic green sheet GS is wound to a roll 62 rewinding the ceramic green sheet GS. The ceramic green sheet may be stably supplied because the transfer roll 80 is disposed in an intermediate region in which the ceramic green sheet is moved from the roll 61 on which the ceramic green sheet GS is wound to the roll 62 rewinding the ceramic green sheet GS.

The paste EP for an internal electrode, disposed on the silicone pattern SP, may be transferred to the ceramic green sheet GS while passing between a pressing roll 13 for a polymer sheet and a pressing roll 63 for a ceramic green sheet to become the internal electrode pattern EP'. The pressing roll 63 for a ceramic green sheet may be rotated in a direction opposite to a direction in which the pressing roll 13 for a polymer sheet is rotated in order to pressure on the paste, thereby transferring the paste EP for an internal electrode disposed on the silicone pattern SP to the ceramic green sheet GS.

The ceramic green sheet GS on which the internal electrode pattern EP' is printed may then be dried by passing through a drying device 73.

In another exemplary embodiment, 0.1 μm or less may be a range of a thickness deviation of the internal electrode pattern EP'. The internal electrode pattern EP' may have the thickness deviation of 0.1 μm or less, thereby forming the internal electrode 121 or 122 having excellent smoothness, and suppressing a step difference in the capacitance formation portion Ac.

Figure 22:
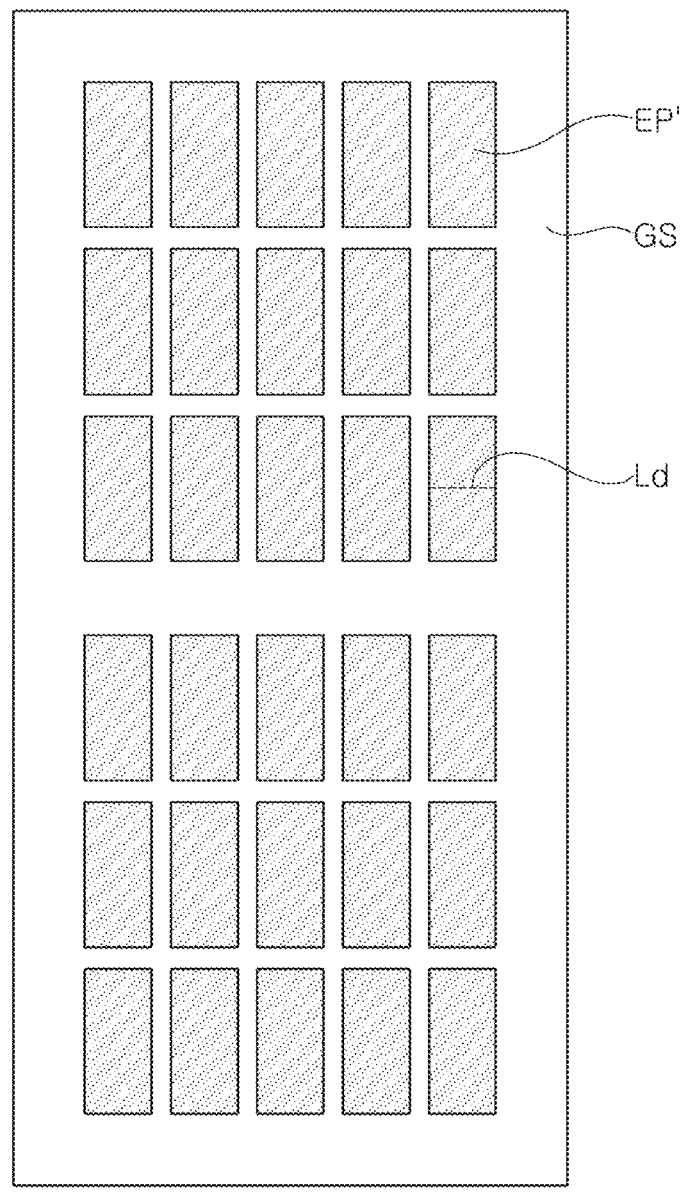
FIG. 22 shows a ceramic green sheet on which an internal electrode pattern is printed.
Figure 23:
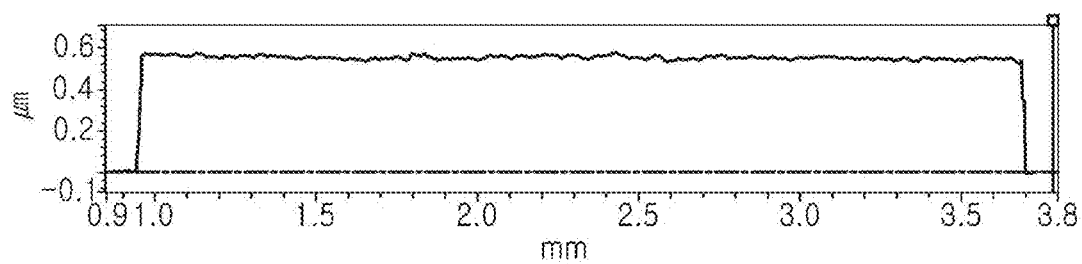
FIG. 23 is a graph showing a thickness of the internal electrode pattern measured along a dotted line of FIG. 22 when the internal electrode pattern is printed using the manufacturing method of the present disclosure.
Figure 24:
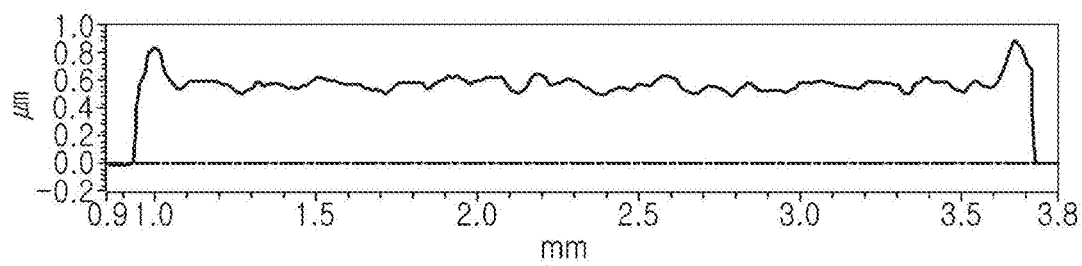
FIG. 24 is a graph showing the thickness of the internal electrode pattern measured along the dotted line of FIG. 22 when the internal electrode pattern is printed using a gravure printing method.

FIG. 22 shows the ceramic green sheet GS on which the internal electrode pattern EP' is printed, FIG. 23 is a graph showing a thickness of the internal electrode pattern EP' measured along a dotted line Ld of FIG. 22 when the internal electrode pattern EP' is printed using the manufacturing method of the present disclosure, and FIG. 24 is a graph showing the thickness of the internal electrode pattern EP' measured along the dotted line Ld of FIG. 22 when the internal electrode pattern EP' is printed using the gravure printing method.

Referring to FIG. 23, it may be confirmed that the internal electrode pattern EP' has a very uniform thickness in which 0.1 μm or less is a difference between a maximum thickness and a minimum thickness.

On the other hand, Referring to FIG. 24, it may be confirmed that a saddle phenomenon occurs in which the end portion of the internal electrode pattern EP' has a greater thickness than its central portion, and the internal electrode pattern EP' has a non-uniform thickness in which 0.2 μm or more is the difference between the maximum thickness and the minimum thickness.

An average thickness of the internal electrode pattern EP' may not need to be particularly limited, and may be determined in consideration of a thickness of the internal electrode 121 or 122 to be obtained.

However, the multilayer electronic component may generally have lower reliability when the internal electrode has a small thickness of less than 0.6 μm, in particular, when having a thickness of 0.4 μm or less.

According to another exemplary embodiment of the present disclosure, the internal electrode pattern EP' may have the uniform thickness and the excellent smoothness, and it is thus possible to suppress the step difference in the capacitor formation portion Ac, and the multilayer electronic component may thus secure excellent reliability even when the fired internal electrode 121 or 122 has an average thickness of 0.4 μm or less.

Therefore, when the fired internal electrode 121 or 122 has the average thickness of 0.4 μm or less by controlling the average thickness of the internal electrode pattern EP', the multilayer electronic component 100 according to the present disclosure may have the more remarkably improved reliability, and may thus more easily have the smaller size and the higher capacitance.

An average thickness of the ceramic green sheet GS may not need to be particularly limited, and may be determined in consideration of a thickness of the dielectric layer 111 to be obtained.

However, according to another exemplary embodiment of the present disclosure, the internal electrode pattern EP' may have the uniform thickness and the excellent smoothness, and it is thus possible to suppress the step difference in the capacitor formation portion, and the multilayer electronic component may thus secure excellent reliability when 0.45 µm or less is an average thickness of the dielectric layer 111.

Therefore, when the sintered dielectric layer 111 has the average thickness of 0.45 µm or less by controlling the average thickness of the ceramic green sheet GS, the multilayer electronic component 100 according to the present disclosure may have the more remarkably improved reliability, and may thus more easily have the smaller size and the higher capacitance.

The Forming of the Body

The stack body may then be formed by stacking the ceramic green sheets GS on each of which the internal electrode pattern EP' is printed. The stack body may be pressed and crimped in the stack direction (i.e., first direction).

The stack body may then be cut to have a size corresponding to that of a body 110 of one multilayer electronic component 100 to obtain a unit stack body. Here, both ends of the internal electrode pattern EP' may be cut to be alternately exposed to both end surfaces of the body in the second direction.

The body 110 may then be obtained by sintering the unit stack body.

The Forming of the External Electrode

The external electrodes 131 and 132 may then be formed on the body 110 to manufacture the multilayer electronic component 100.

A method of forming the external electrodes 131 and 132 is not particularly limited, and may use a method of dipping both the end surfaces of the body into a paste including a conductive metal and glass, or a method of transferring a sheet including the conductive metal. In addition, the external electrode may be formed using the paste including the conductive metal and resin, or using an atomic layer deposition (ALD) method, a molecular layer deposition (MLD) method, a chemical vapor deposition (CVD) method, a sputtering method, etc.

In addition, a plating process may be additionally performed so that the external electrode 131 or 132 includes a plating layer 131b or 132b.

Inventive Example

Prepared are sample capacitors each having a different ratio of the line defect area to check an effect depending on the ratio of the line defect area. Here, the line defect indicates the region in which 110% or more and 126% or less is the range of the brightness intensity compared to the average value of the brightness intensity of the cover portion.

In Table 1, the manufacturing method indicates the method of printing the internal electrode pattern, and the sample capacitor is manufactured by processes having the same condition except for the method of printing the internal electrode pattern. "A" is a case where the internal electrode pattern is formed according to the above-described manufacturing method of the multilayer electronic component according to another exemplary embodiment of the present disclosure, "G" is a case where the internal electrode pattern formed by the gravure printing method, and "S" is a case where the internal electrode pattern is formed by the screen printing method.

Table 1 shows that the line defect is measured in the region ML in the cross-section of the body in the first-second direction or the region MW in the cross-section of the body in the first-third direction, and measured using a measurement method of the optical microscope and SigmaScan Pro as described above.

Figure 10:
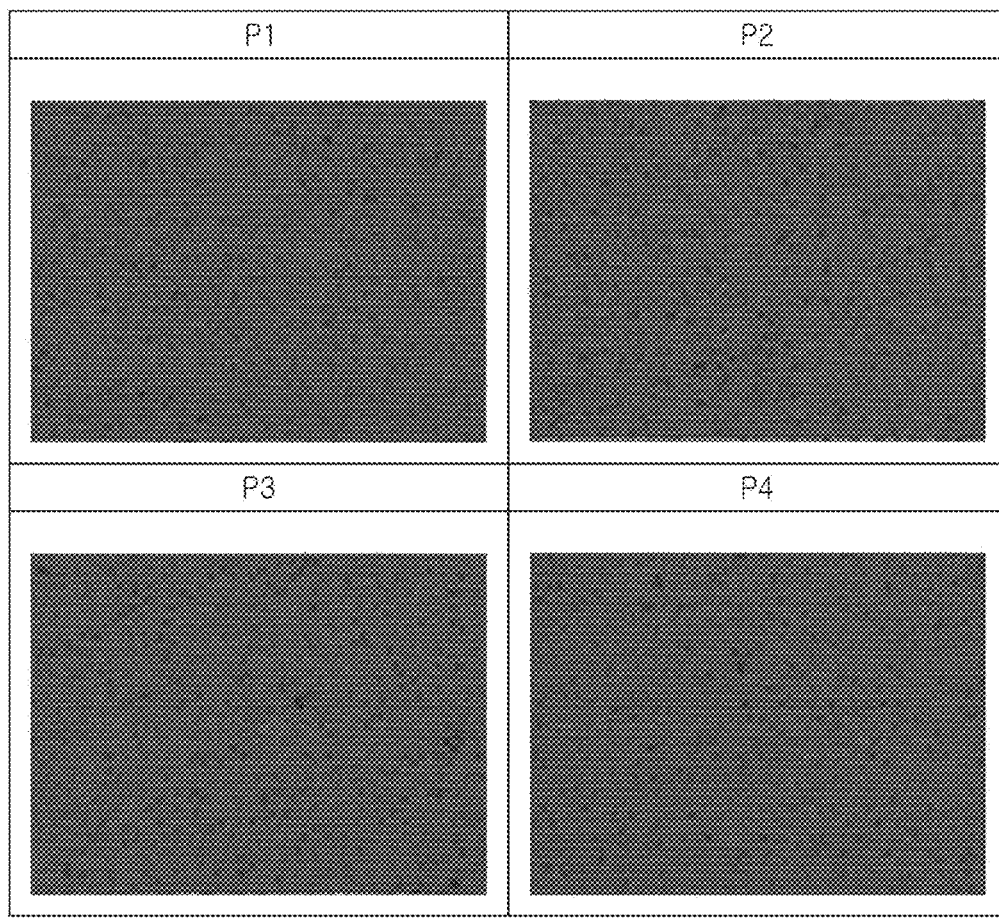
FIG. 10 is an image obtained by scanning regions P1, P2, P3 and P4 of FIG. 8 by using a scanning electron microscope (SEM)
Figure 15:
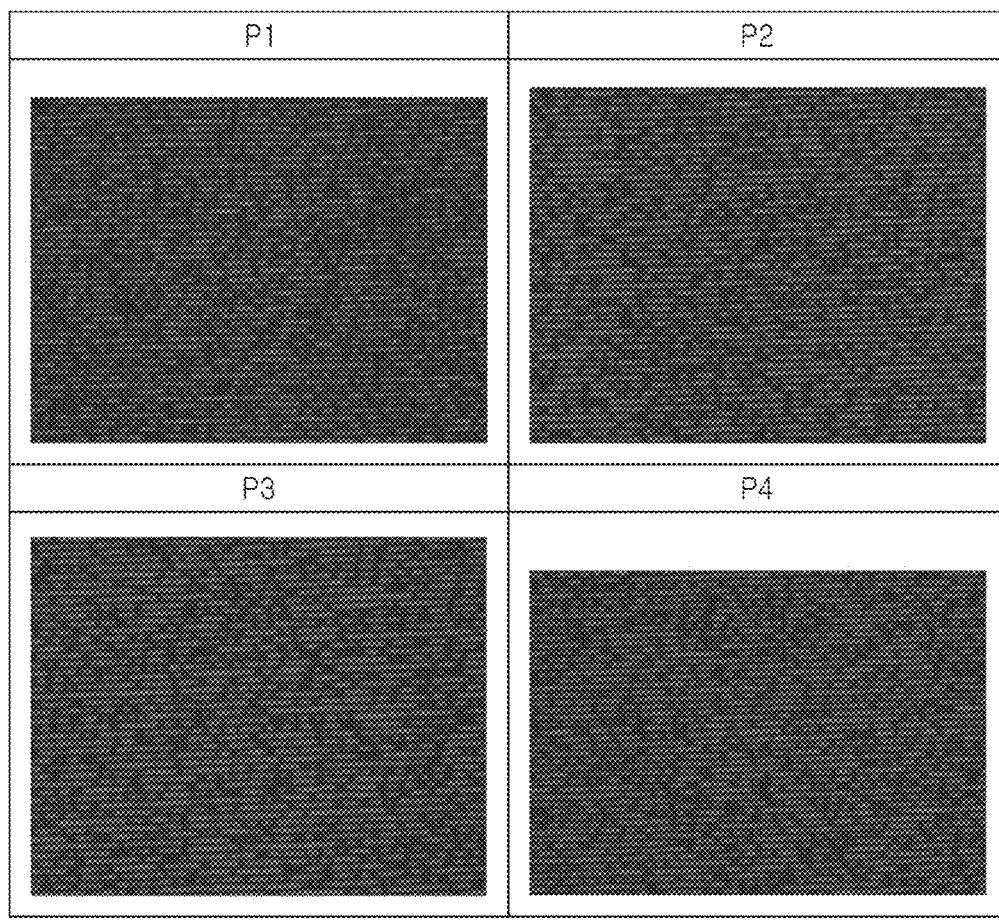
FIG. 15 is an image obtained by scanning regions P1, P2, P3 and P4 of FIG. 13 by using the scanning electron microscope (SEM)
Figure 18:
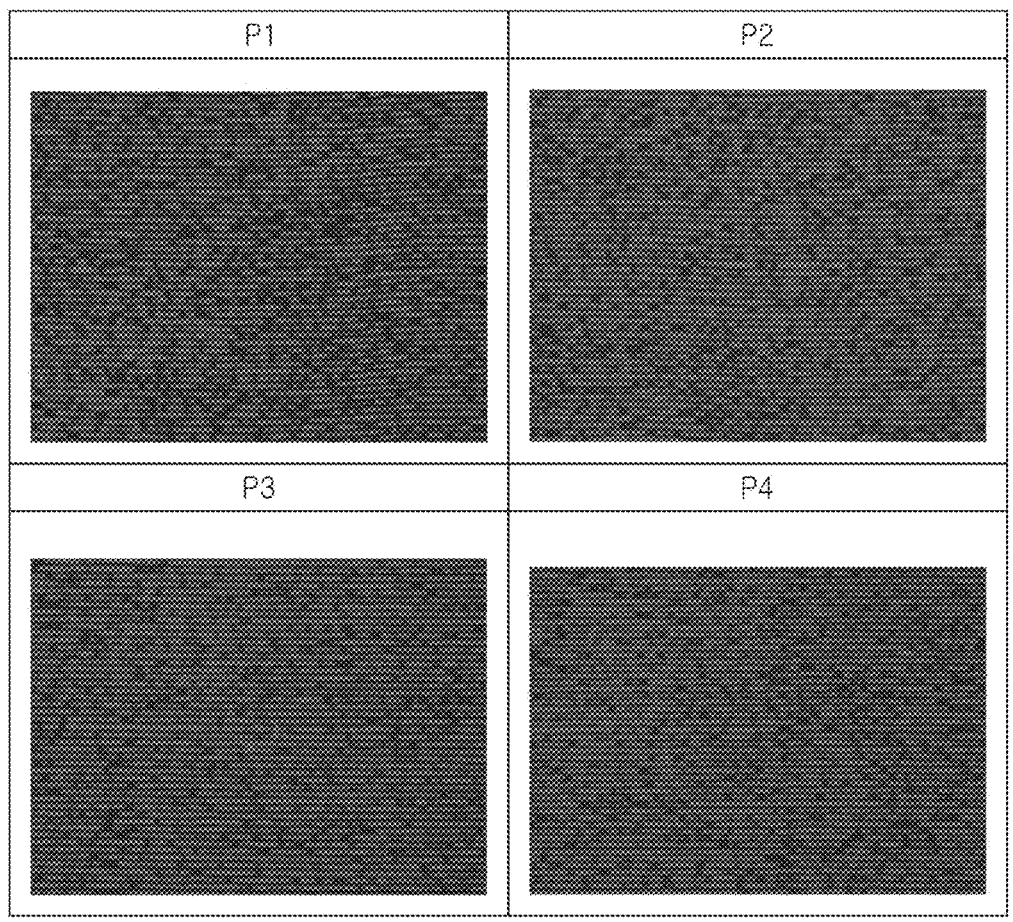
FIG. 18 is an image obtained by scanning regions P1, P2, P3 and P4 of FIG. 16 by using the scanning electron microscope (SEM)

In Table 1, the connectivity of the internal electrode is not measured for all test numbers, and measured for Test Nos. 1, 4 and 5. Test No. 1 is a case where the connectivity of the internal electrode is measured in the images of FIG. 10, which are the images obtained by scanning the regions P1, P2, P3 and P4 shown in FIG. 8 by using the SEM, Test No. 4 is a case where the connectivity of the internal electrode is measured in the images of FIG. 15, which are the images obtained by scanning the regions P1, P2, P3 and P4 shown in FIG. 13 by using the SEM, and Test No. 5 is a case where the connectivity of the internal electrode is measured in the images of FIG. 18, which are the images obtained by scanning the regions P1, P2, P3 and P4 shown in FIG. 16 by using the SEM. Next, each of the average values, standard deviations, and values of the CV are calculated and recorded in Table 1 below.

A ratio of the breakdown voltage (BDV) shown in Table 1 is obtained by preparing 100 sample capacitors for each test number, and then increasing a voltage to set a voltage at which a short circuit occurs in the sample capacitor to the BDV, thereby obtaining each average value of the BDV for the 100 samples. The average value of the BDV in Test No. 1 is used as a reference value (100%), and each ratio of the average values of the BDV of Test Nos. 2 to 7 is described as the ratio of the BDV.

TABLE 1

| Test No. | Manufacturing Method | Measurement Region | Connectivity (%) of Internal electrode | | | | | Standard Deviation (%) | Value (%) of CV | Line Defect (area %) | Ratio of BDV |
| | | | P1 | P2 | P3 | P4 | Average | | | | |
|---|---|---|---|---|---|---|---|---|---|---|---|
| 1 | A | ML | 83.4 | 83.5 | 83.9 | 82.8 | 83.4 | 0.39 | 0.47 | 0.0 | 100% |
| 2 | A | ML | 83.7 | 83.5 | 83.9 | 82.1 | 83.3 | 0.71 | 0.85 | 1.7 | 100% |
| 3 | A | ML | 81.8 | 82.4 | 84.9 | 84.2 | 83.3 | 1.27 | 1.52 | 5.5 | 99% |
| 4 | S | ML | 79.4 | 82.8 | 83.1 | 84.2 | 82.4 | 1.79 | 2.18 | 7.5 | 86% |
| 5 | G | MW | 79.8 | 82.1 | 85.6 | 86.3 | 83.5 | 2.64 | 3.16 | 58.2 | 82% |
| 6 | G | MW | — | — | — | — | — | — | — | 54.3 | 82% |
| 7 | G | ML | — | — | — | — | — | — | — | 23.4 | 85% |

Test Nos. 1 to 3 show that a BDV characteristic is thus very good because 5.5 area % or less is the range of the area fraction of the line defect, and dispersion of the connectivity of the internal electrode is very good because 1.3% or less is the range of the standard deviation of the connectivity of the internal electrode and 1.8% or less is the range of the value of the CV.

Test Nos. 4 to 7 show that more than 5.5 area % is the range of the area fraction of the line defect, and accordingly, the standard deviation and CV for the connectivity of the internal electrode have high values, and the ratio of the BDV is rapidly reduced to 86%.

Figure 19:
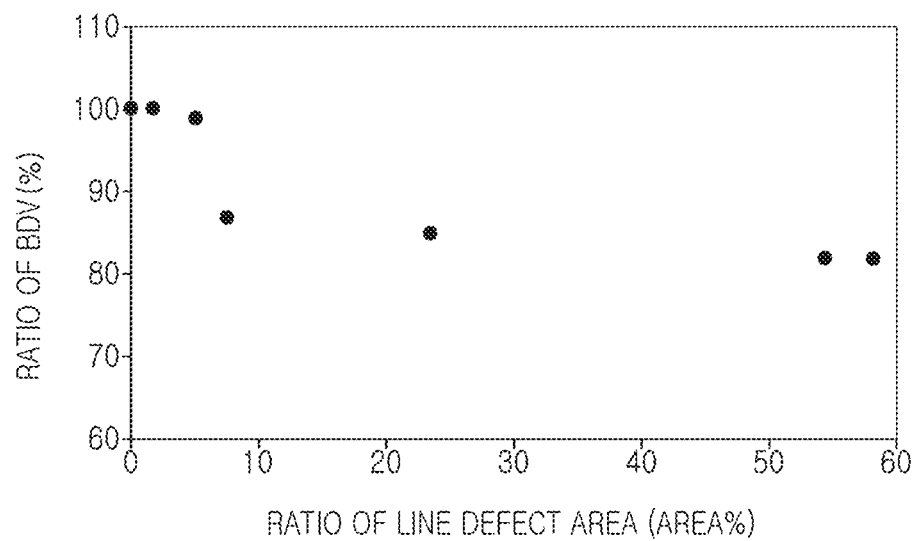
FIG. 19 is a graph showing a ratio of a breakdown voltage (BDV) based on a ratio of a line defect area.

Referring to FIG. 19 showing the ratio of the BDV, based on the ratio of the line defect area of Test Nos. 1 to 7, it may be seen that the ratio of the BDV is rapidly reduced when more than 5.5 area % is the range of the area fraction of the line defect.

As set forth above, the present disclosure may provide the multilayer electronic component having the improved reliability by controlling the area fraction of the region of the capacitance formation portion, in which 110% or more and 126% or less is the range of the brightness intensity compared to the average value of the brightness intensity of the cover portion.

The present disclosure may also provide the multilayer electronic component having the higher reliability by improving the connectivity of the internal electrode.

The present disclosure may also provide the multilayer electronic component having the higher reliability by improving the smoothness of the internal electrode.

The present disclosure may also improve the breakdown voltage of the multilayer electronic component.

The present disclosure may also provide the reliable multilayer electronic component having the smaller size and the high capacitance.

The present disclosure may also provide the multilayer electronic component having the improved capacitance per its unit volume.

The present disclosure may also provide the reliable multilayer electronic component having the mass productivity and the higher reliability.

While the exemplary embodiments have been shown and described above, it will be apparent to those skilled in the art that modifications and variations could be made without departing from the scope of the present disclosure as defined by the appended claims.

What is claimed is:

1. A multilayer electronic component comprising:
    a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of internal electrodes alternately disposed in the first direction, while having a respective one of the plurality of dielectric layers interposed therebetween, and cover portions disposed on both end surfaces of the capacitance formation portion in the first direction; and
    external electrodes disposed on the body,
    wherein SL is 5.5 area % or less in which SL indicates a ratio of an area of NL to an area of ML, ML indicates a region excluding 35 μm at both ends of the capacitance formation portion in the second direction, and positioned in a center of a region in which a first cross-section of the body in a first-second direction is divided into thirds in the first direction, and NL indicates a region of ML in which a range of brightness intensity is 110% or more and 126% or less compared to an average value of brightness intensity of one of the cover portions in the first cross-section.

2. The multilayer electronic component of claim 1, wherein SW is 5.5 area % or less in which SW indicates a ratio of an area of NW to an area of MW, MW indicates a region excluding 35 μm at both ends of the capacitance formation portion in the third direction, and positioned in a center of a region in which a second cross-section of the body in a first-third direction is divided into thirds in the first direction, and NW indicates a region of MW in which a range of brightness intensity is 110% or more and 126% or less compared to an average value of brightness intensity of the one of the cover portions in the second cross-section of the body.

3. The multilayer electronic component of claim 2, wherein a range of SW measured at all of three equally spaced points of the body in the second direction, based on three cross-sections of the body cut in the first-third direction, is 5.5 area % or less.

4. The multilayer electronic component of claim 2, wherein a range of an average value of connectivity of an internal electrode in MW is 80% or more, and the connectivity of the internal electrode in MW indicates a ratio of a length of a portion in which the internal electrode in MW is actually formed to a length of the internal electrode in MW.

5. The multilayer electronic component of claim 2, wherein a range of a standard deviation of connectivity of an internal electrode in MW is 1.3% or less, and the connectivity of the internal electrode in MW indicates a ratio of a length of a portion in which the internal electrode in MW is actually formed to a length of the internal electrode in MW.

6. The multilayer electronic component of claim 2, wherein a range of a value of coefficient of variation (CV) of connectivity of an internal electrode in MW is 1.8% or less, and the connectivity of the internal electrode in MW indicates a ratio of a length of a portion in which the internal electrode in MW is actually formed to a length of the internal electrode in MW.

7. The multilayer electronic component of claim 1, wherein a range of SL measured at all of three equally spaced points of the body in the third direction, based on three cross-sections of the body cut in the first-second direction, is 5.5 area % or less.

8. The multilayer electronic component of claim 1, wherein a range of an average value of connectivity of an internal electrode in ML is 80% or more, and the connectivity of the internal electrode in ML indicates a ratio of a length of a portion in which the internal electrode in ML is actually formed to a length of the internal electrode in ML.

9. The multilayer electronic component of claim 1, wherein a range of a standard deviation of connectivity of an internal electrode measured in ML is 1.3% or less, and the connectivity of the internal electrode in ML indicates a ratio of a length of a portion in which the internal electrode in ML is actually formed to a length of the internal electrode in ML.

10. The multilayer electronic component of claim 1, wherein a range of a value of a coefficient of variation (CV) of connectivity of an internal electrode in ML is 1.8% or less, and the connectivity of the internal electrode in ML indicates a ratio of a length of a portion in which the internal electrode in ML is actually formed to a length of the internal electrode in ML.

11. The multilayer electronic component of claim 1, wherein a range of an average thickness of one of the plurality of internal electrodes is 0.4 μm or less.

12. The multilayer electronic component of claim 1, wherein a range of an average thickness of one of the plurality of dielectric layers 0.45 µm or less.

13. The multilayer electronic component of claim 1, wherein a range of an average thickness of one of the cover portions is 15 µm or less.

14. The multilayer electronic component of claim 1, wherein a range of a maximum size of the multilayer electronic component in the second direction is 0.66 mm or less, and a range of a maximum size of the multilayer electronic component in the third direction is 0.33 mm or less.

15. A multilayer electronic component comprising:
a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of internal electrodes alternately disposed in the first direction, while having a respective one of the plurality of dielectric layers interposed therebetween, and cover portions disposed on both end surfaces of the capacitance formation portion in the first direction; and
external electrodes disposed on the body,
wherein a range of a standard deviation of connectivity of an internal electrode in ML is 1.3% or less, in which ML indicates a region excluding 35 µm at both ends of the capacitance formation portion in the second direction, and positioned in a center of a region in which a first cross-section of the body in a first-second direction is divided into thirds in the first direction, and the connectivity of the internal electrode in ML indicates a ratio of a length of a portion in which the internal electrode in ML is actually formed to a length of the internal electrode in ML.

16. The multilayer electronic component of claim 15, wherein a range of a standard deviation of connectivity of the internal electrode in MW is 1.3% or less, and MW indicates a region excluding 35 µm at both ends of the capacitance formation portion in the third direction, and positioned in a center of a region in which a second cross-section of the body in a first-third direction is divided into thirds in the first direction.

17. The multilayer electronic component of claim 16, wherein a range of an average value of connectivity of the internal electrode in ML or MW is 80% or more.

18. The multilayer electronic component of claim 16, wherein a range of a value of coefficient of variation (CV) of connectivity of the internal electrode in ML or MW is 1.8% or less.

19. The multilayer electronic component of claim 16, wherein SL or SW is 5.5 area % or less in which SL indicates a ratio of an area of NL to an area of ML, and NL indicates a region of ML in which a range of brightness intensity is 110% or more and 126% or less compared to an average value of brightness intensity of one of the cover portions, and SW indicates a ratio of an area of NW to an area of MW, and NW indicates a region of MW in which a range of brightness intensity is 110% or more and 126% or less compared to the average value of the brightness intensity of the one of the cover portions.

20. The multilayer electronic component of claim 15, wherein the range of the standard deviation of the connectivity of the internal electrode measured at all of three equally spaced points of the body in the third direction, based on ML in three cross-sections of the body cut in the first-second direction, is 1.3% or less.

21. The multilayer electronic component of claim 15, wherein a range of an average thickness of one of the plurality of internal electrodes is 0.4 µm or less.

22. The multilayer electronic component of claim 15, wherein a range of an average thickness of one of the plurality of dielectric layers is 0.45 µm or less.

23. The multilayer electronic component of claim 15, wherein a range of an average thickness of one the cover portions is 15 µm or less.

24. The multilayer electronic component of claim 15, wherein a range of a maximum size of the multilayer electronic component in the second direction is 0.66 mm or less, and a range of a maximum size of the multilayer electronic component in the third direction is 0.33 mm or less.

25. A multilayer electronic component comprising:
a body including first and second surfaces opposing each other in a first direction, third and fourth surfaces connected to the first and second surfaces and opposing each other in a second direction, and fifth and sixth surfaces connected to the first to fourth surfaces and opposing each other in a third direction, and including a capacitance formation portion including a plurality of dielectric layers and a plurality of internal electrodes alternately disposed in the first direction, while having a respective one of the plurality of dielectric layers interposed therebetween, and cover portions disposed on both end surfaces of the capacitance formation portion in the first direction; and
external electrodes disposed on the body,
wherein a range of a value of a coefficient of variation (CV) of connectivity of an internal electrode in ML is 1.8% or less, the connectivity of the internal electrode in ML indicates a ratio of a length of a portion in which the internal electrode in ML is actually formed to a length of the internal electrode in ML, and ML indicates a region excluding 35 µm at both ends of the capacitance formation portion in the second direction, and positioned in a center of a region in which a first cross-section of the body in a first-second direction is divided into thirds in the first direction.

26. The multilayer electronic component of claim 25, wherein a range of an average value of connectivity of the internal electrode in ML is 80% or more.

27. The multilayer electronic component of claim 25, wherein a range of a value of coefficient of variation (CV) of connectivity of the internal electrode in MW is 1.8% or less, the connectivity of the internal electrode in MW indicates a ratio of a length of a portion in which the internal electrode in MW is actually formed to a length of the internal electrode in MW, and MW indicates a region excluding 35 µm at both ends of the capacitance formation portion in the third direction, and positioned in a center of a region in which a second cross-section of the body in a first-third direction is divided into thirds in the first direction.

* * * * *